(12) United States Patent
Denny

(10) Patent No.: US 10,306,466 B2
(45) Date of Patent: May 28, 2019

(54) CUSTOMER/MERCHANT INTERACTION SYSTEM FOR MERCHANT BRANDING AND PRODUCT INFORMATION

(71) Applicant: SecureWiFi Technologies, LLC, Plymouth, MN (US)

(72) Inventor: Douglas Denny, Plymouth, MN (US)

(73) Assignee: SecureWiFi Technologies, LLC, Plymouth, MN (US)

( * ) Notice: Subject to any disclaimer, the term of this patent is extended or adjusted under 35 U.S.C. 154(b) by 0 days.

(21) Appl. No.: 15/665,186

(22) Filed: Jul. 31, 2017

(65) Prior Publication Data

US 2017/0359718 A1    Dec. 14, 2017

Related U.S. Application Data

(63) Continuation-in-part of application No. 15/146,618, filed on May 4, 2016, now Pat. No. 9,730,059, which (Continued)

(51) Int. Cl.
| | |
|---|---|
| *G06K 19/00* | (2006.01) |
| *H04W 12/04* | (2009.01) |
| *H04L 9/06* | (2006.01) |
| *H04L 9/08* | (2006.01) |
| *H04W 12/02* | (2009.01) |
| *G06F 21/60* | (2013.01) |

(Continued)

(52) U.S. Cl.
CPC ............ *H04W 12/04* (2013.01); *G06F 16/00* (2019.01); *G06F 21/602* (2013.01); *G06F 21/606* (2013.01); *G06Q 10/107* (2013.01); *G06Q 30/0207* (2013.01); *G09C 5/00* (2013.01); *H04L 9/0631* (2013.01); *H04L 9/0822* (2013.01); *H04L 9/0825* (2013.01); *H04L 9/0827* (2013.01); *H04L 9/0861* (2013.01); *H04L 9/0863* (2013.01); *H04L 63/061* (2013.01); *H04W 12/02* (2013.01); *G06F 2221/2107* (2013.01); *G06F 2221/2141* (2013.01); *H04L 63/0435* (2013.01); *H04L 63/0442* (2013.01); *H04L 67/306* (2013.01); *H04L 2209/80* (2013.01); *H04L 2463/062* (2013.01); *H04W 4/80* (2018.02); *H04W 84/18* (2013.01)

(58) Field of Classification Search
USPC ................................ 235/435, 439, 454, 462
See application file for complete search history.

(56) References Cited

U.S. PATENT DOCUMENTS

| | | | | |
|---|---|---|---|---|
| 9,251,119 B2* | 2/2016 | Denny | ................ | G06Q 10/107 |
| 9,356,777 B2* | 5/2016 | Denny | ................ | H04L 9/0822 |
| 9,730,059 B2* | 8/2017 | Denny | ................ | H04L 9/0822 |

* cited by examiner

*Primary Examiner* — Matthew Mikels
(74) *Attorney, Agent, or Firm* — Craige Thompson; Thompson Patent Law; Vincent Musgrove

(57) ABSTRACT

Apparatus and associated methods relate to securely transmitting, directly between two mobile devices, AES-256 encrypted file attachments which are decrypted within an application program (APP) using a decryption key that is available only to the APP. In an illustrative embodiment, the encrypted file may be attached to an e-mail. The e-mail may be transmitted directly to another mobile device via direct Wi-Fi, for example. The e-mail may be transmitted directly to another mobile device using Bluetooth, for example. In encrypted attachment may be deciphered only within the APP running on the receiving mobile device using a private key accessible to only the APP.

20 Claims, 16 Drawing Sheets

Related U.S. Application Data is a continuation of application No. 14/284,146, filed on May 21, 2014, now Pat. No. 9,356,777, which is a continuation-in-part of application No. 13/744,531, filed on Jan. 18, 2013, now Pat. No. 9,251,119.

(60) Provisional application No. 61/895,757, filed on Oct. 25, 2013, provisional application No. 61/832,073, filed on Jun. 6, 2013, provisional application No. 61/589,763, filed on Jan. 23, 2012.

(51) Int. Cl.
| | |
|---|---|
| *G06Q 10/10* | (2012.01) |
| *H04L 29/06* | (2006.01) |
| *G06Q 30/02* | (2012.01) |
| *G09C 5/00* | (2006.01) |
| *G06F 16/00* | (2019.01) |
| *H04W 84/18* | (2009.01) |
| *H04W 4/80* | (2018.01) |
| *H04L 29/08* | (2006.01) |

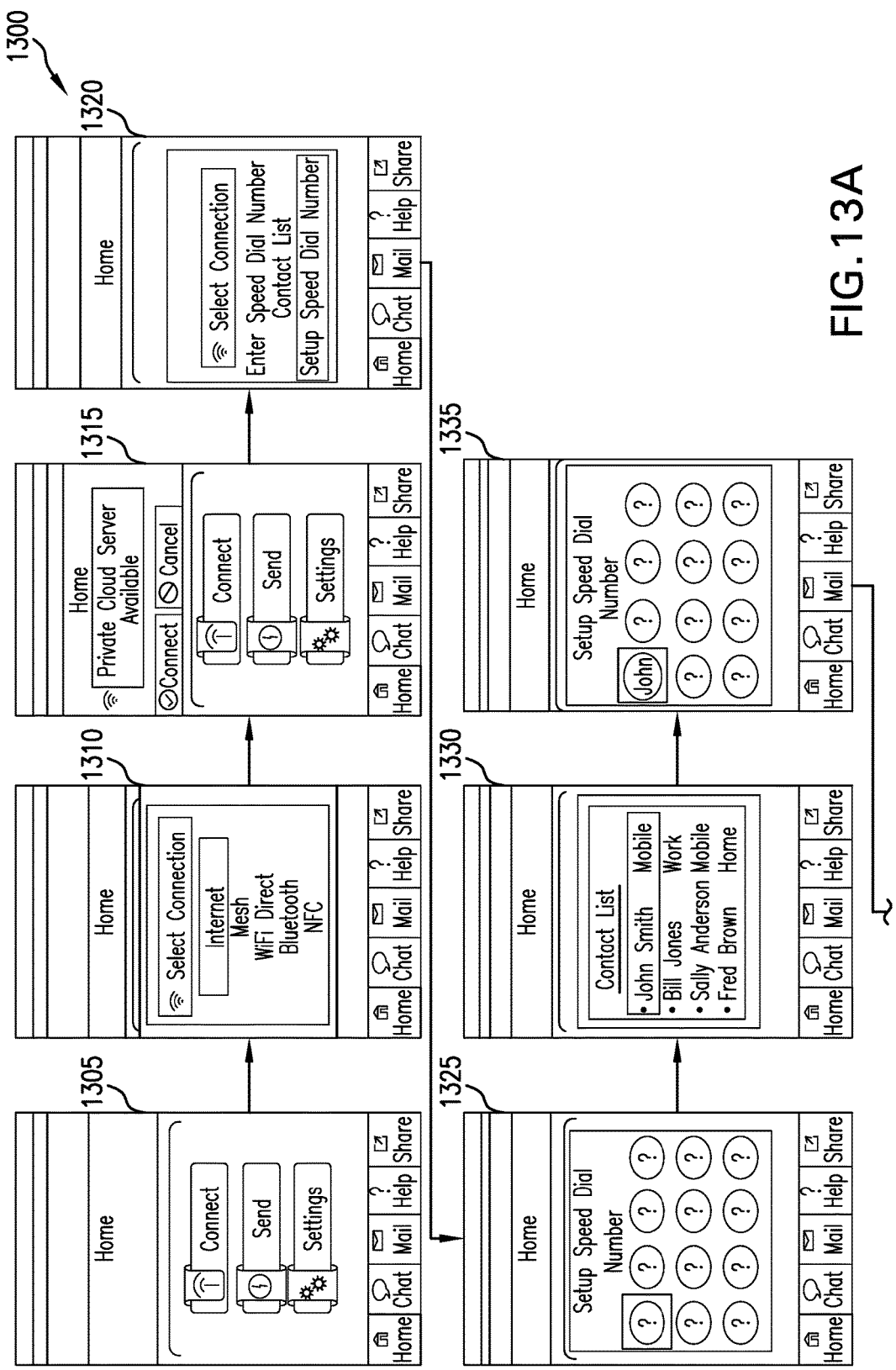

CUSTOMER/MERCHANT INTERACTION SYSTEM FOR MERCHANT BRANDING AND PRODUCT INFORMATION

CROSS-REFERENCE TO RELATED APPLICATIONS

This application claims the benefit and is a continuation-in-part of U.S. patent application Ser. No. 15/146,618 titled "Secure Communications System for Direct Transfer Between Mobile Device," filed by Douglas Denny on May 4, 2016, which is a continuation of U.S. patent application Ser. No. 14/284,146, titled "Secure Communications System for Direct Transfer Between Mobile Device," filed by Douglas Denny on May 21, 2014, which claims the benefit of U.S. Provisional Application Ser. No. 61/895,757 titled "System for the Exchange of Optically-Encoded Information," filed by Douglas Denny on Oct. 25, 2013, and U.S. Provisional Application Ser. No. 61/832,073 titled "Location and Information Search Assistant," filed by Douglas Denny on Jun. 6, 2013, and which is also a continuation-in-part of U.S. patent application Ser. No. 13/744,531 titled "System for the Exchange of Optically-Encoded Information," filed by Douglas Denny on Jan. 18, 2013, which claims the benefit of U.S. Provisional Application Ser. No. 61/589,763, titled "Non-Optical Exchange of Optically Encoded Information," filed by Douglas Denny on Jan. 23, 2012.

This application incorporates the entire contents of the foregoing application(s) herein by reference.

TECHNICAL FIELD

Various embodiments relate generally to apparatus and methods for exchanging information between customers and merchants.

BACKGROUND

Many people exchange contact information every day. Contact information is commonly exchanged during business occasions as well as personal occasions. There are many tools for recording and storing contact information. One tool for storing contact information may be a paper address book. Another more modern tool for storing contact information may be an electronic device. With the ever-increasing fast-paced society, it is becoming more and more vital to effectively maintain accurate records of contact information.

The transfer of information has evolved from written communication to electronic communication. Not too long ago, letters were a common way for correspondence between individuals. Letters were used for personal communications as well as business communications. Today, electronic communications perform many of the same functions as the postal service performed in years past. Electronics communications can be wired or wireless. Various protocols and/or standards of such communications have been attempted, and some of these have become standards. E-mail, texting, and telephonic communications, both wired and wireless, are some of the new communication protocols that are in use today.

Sometimes privacy is important. Secure forms of communications may permit a communication between parties without fear of a third party intercepting and/or understanding the communication. These secure communications may contain sensitive information, such as financial records, or trade secrets, for example. Other examples of sensitive information may be relationship information, medical information, or legal information. Protective measures may be taken so that such sensitive communications remain private between the intended parties alone.

SUMMARY

Apparatus and associated methods may relate to a mobile-device app (APP) and corresponding APP services provided by retail merchant or a cloud based provider. The APP and corresponding services may provide merchants a method of gaining customer information while providing customers with product or service information, rewards, promotions, and/or other assistance. Upon entering a participating merchant location, for example, the APP may automatically establish a short-range communications link with a merchant's short-range network. This network may in turn be capable of connecting with a corresponding APP service which may or may not be cloud based. Larger merchants may provide the corresponding APP services on-location using a server, for example. In accordance with an exemplary embodiment, the APP may have a Chameleon™ feature, which may permit the merchant an ability to customize the graphical user interface (GUI) of the APP running on the customer's mobile device. Customizable information may include brand information, custom graphics, product or service information and/or customer assistance. The Chameleon™ feature may permit the user to have but a single application to interface with many different merchants upon entering the ranges of their short-range on-location communication networks.

In some embodiments, the APP may be capable of obtaining the location information of the mobile device, using its GPS location system for example. In various embodiments, the APP may provide the merchant with this obtained device location information. In accordance with some embodiments, the customer may permit the sharing of his/her shopping list, so as to enable the merchant to facilitate store navigation assistance. In various embodiments, the APP may have a voice activated response capability to provide personalized on-site product or event location, pricing, specials, and information for better navigation and pre-purchase and destination decisions. In some embodiments, the APP may connect with the merchant network using an Advanced Encryption Standard (AES) symmetric-key encryption. In some embodiments, the customer may enable or disable the secure sharing of various personal contact data and other Big Data information. In some embodiments, the Connect Enterprise System (CES) may maintain customer profile information.

Various embodiments may achieve one or more advantages. For example, some embodiments may provide a customer a better shopping experience. In various embodiments, a customer may only need but a single APP for the many merchants that he frequents, and these many merchants may use the Chameleon™ rebranding capability to customize the APP according to the merchant's needs and desires. In some embodiments, the customer may benefit financially by being offered product coupons for use on selected merchant products. In various embodiments, a Location, Information, and Navigation Digital Assistant (AskLINDA) may provide search assistance to the customer. For example, a customer may verbally ask AskLINDA to help him/her find where the ketchup is located, and AskLINDA may respond verbally as "in aisle seven" or by way of a map display on the screen of the mobile device. In an exemplary embodiment, a user may scan a product's bar code to receive pricing and other product information. In some embodiments, the CES may suggest products to the customer selected by the merchant based upon the customer's profile.

In various embodiments, the merchant may be afforded an improved Loyalty Marketing tool. The quid pro quo of the APP, permitting users to save money for the exchange of personal profile information, may vastly improve the quality of the Big Data collected by merchants. In various embodiments, the APP may be rebranded with the merchant's branding so as to have the look and feel desired by the merchant. With the customer's permission, the merchant may collect data related to pre-purchase customer information. In one exemplary embodiment, the customer's product inquiries and bar code scans may be made available to the merchant with the customer's permission. For example, the customer's location and movement within the store may be obtained with customer approval. The customer's shopping list may be made known to the merchant, for example. In some embodiments, the customer's requests for product location or information may be collected. In various embodiments, with the customer's permission, the actual purchase information may be collected by the merchant. For example, the customer's detailed purchase list and coupon use may be collected by the merchant. This information may be compared and contrasted with the customer's pre-purchase information. Such valuable Big Data may provide a merchant with information that may prove useful for better staffing, for example. This Big Data may also help the merchant better market the services or wares being offered. For example, the customers' location information may alert a merchant that more cashiers are or will be needed. In some embodiments, the Big Data collected by the merchant may help the merchant profile the customer so as to provide coupons to the customer that may encourage the purchase of particular goods or services.

Apparatus and associated methods may relate to encoded files transferred over an encrypted wireless communications channel for providing doubly encrypted protection of information exchange between a source and a target device. In an illustrative example, a file retrieved from memory in a mobile device may be encrypted using secure AES-256 encryption technology to create a pre-encapsulated file, and securely sending, over an encrypted wireless communications channel, the file to a mobile device configured to receive and decode the AES-256 encrypted file. In some embodiments, the communications channel may use non-optical QR encoding. In an exemplary embodiment, the communications channel may use Bluetooth standards of communication. In some embodiments, the channel may use Near Field Communication (NFC) protocols. In one exemplary embodiment, Wi-Fi Protected Access (WPA) protocols may be used. In an exemplary embodiment, the information exchange may associate each file transferred with optically encoded contact information.

In accordance with an exemplary embodiment, a first user contact information may be encoded in a two-dimensional barcode format and displayed upon the screen of the source device. The barcode may be transmitted over a non-optical communications link to the target device via a wireless connection made between the source device and the target device. For example, the source device and the target device may employ software functionality to enable a secure connection between the devices. The encoded barcode may be transmitted via the communications link using a short-wavelength medium. In some examples, once the barcode is received by the target device, the target device may employ the same non-industry standard coding scheme for decoding the barcode that was used by the source device to encode the contact information in the barcode format. For example, some embodiments may provide Advanced Encryption Standard (AES) symmetric-key encryption. Once the contact information is decoded, the target device may be enabled to store the relevant contact fields in a data store of the target device.

In accordance with another exemplary embodiment, the communications link may comprise an optical communications link. For example, the barcode may be portrayed on the display of the source device and read via an image reader on the target device. In some exemplary embodiments, an optical communications link provided by the image reader may advantageously avoid communication problems between electronic handheld devices having different operating systems. In some examples, the image reader may comprise a mobile device camera.

Various embodiments may achieve one or more advantages. For example, a user may enable one or more contact fields upon the source device for transmission to the target device. For example, a physical address field of a first user on the source device may be disabled to restrict encoding of the respective field in the barcode format and thus restrict transmission of the physical address field to the target device. In some examples, the target device may be configured to parse the decoded contact information to determine one or more contact fields to populate with the decoded contact information within the data store of the target device. In some examples, a tag including a time and a location of the contact exchange may be encoded in the barcode and transmitted to the source device for storage with the contact fields of the user contact information.

In some examples, a notification signal may be provided to the source and target devices once the barcode information is successfully transmitted to the target device. For examples, a vibratory signal may be provided to both the source device and the target device upon successful transmission of the contact information. In some embodiments, the successful transmission of contact information may initiate a secure transmission of an encoded file. In some embodiments, an encoded file may be associated and transmitted with encoded contact information. In some embodiments, the received transmission may be parsed so that the received file may be associated with a contact identified in the encoded contact information.

Various embodiments may achieve one or more advantages. In some embodiments, the received files may be automatically sorted into folders associated with a contact identified in the accompanying associated encoded contact information. In some embodiments, the optically encoded contact information may include decoding key and transmitted optically to provide line of sight security an associated file transmission. In some embodiments, the use of NFC types of communications limits the potential of unwanted receivers of the encoded file transmissions. In some embodiments, the files may be stored on the mobile device only in the encoded format so that a lost mobile device presents a lower risk of file discovery. In an exemplary embodiment, the decoded file may not reside in storage but be used only for display upon the display device of the mobile device, for example.

Apparatus and associated methods relate to securely transmitting, directly between two mobile devices, AES-256 encrypted file attachments which are decrypted within an application program (APP) using a decryption key that is available only to the APP. In an illustrative embodiment, the encrypted file may be attached to an e-mail and/or to a text message. The e-mail or text message may be transmitted directly to another mobile device via direct Wi-Fi, for example. In some embodiments, the e-mail or text message may be transmitted via Near Field Communications (NFC). The e-mail or text message may be transmitted directly to another mobile device using Bluetooth, for example. In encrypted attachment may be deciphered only within the APP running on the receiving mobile device using a private key accessible to only the APP.

BRIEF DESCRIPTION OF THE DRAWINGS

FIGS. 13A, 13B, and 13C depict various states of an exemplary private connection system application program (PCS APP) user interface.

Like reference symbols in the various drawings indicate like elements.

DETAILED DESCRIPTION OF ILLUSTRATIVE EMBODIMENTS

To aid understanding, this document is organized as follows. First, an exemplary secure communications system for direct transfer of files between mobile devices will be discussed with reference to FIGS. 1-4. Then with reference to FIGS. 5-11, Location, Information, and Navigation Digital Assistance (AskLINDA) for mobile device users will be discussed. Both of the above two communications methods are related to a system for the exchange of optically encoded information, which will then be discussed and has been described in the related patent applications that have been fully incorporated by reference above.

Figure 1:
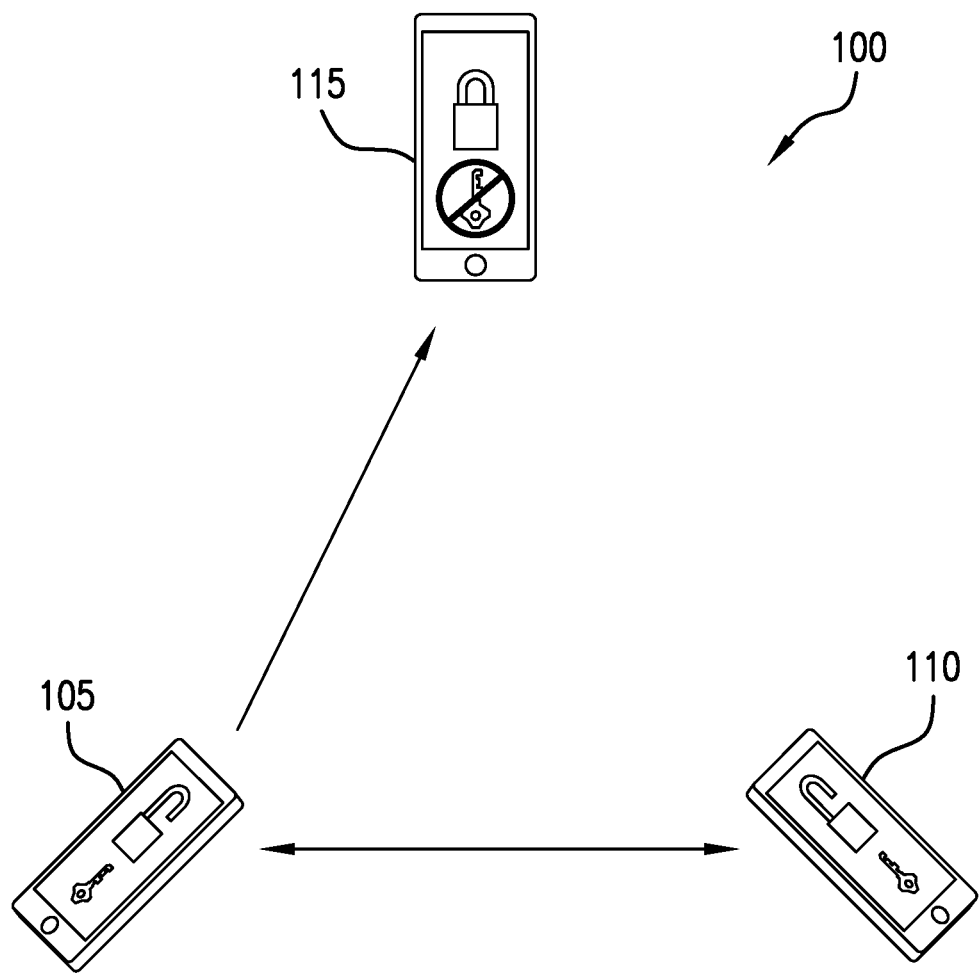
FIG. 1 depicts an exemplary Direct Wi-Fi communication between two Apps using AES-256 encrypted files.

FIG. 1 depicts an exemplary Direct Wi-Fi communication between two Apps using AES-256 encrypted files. In FIG. 1, a direct communication 100 including an encoded file is schematically depicted. The direct communication 100 is between a sending mobile device 105 and a receiving mobile device 110. The user of the sending mobile device may select a file for secure transmission. The sending device may then send a request to the receiving device for a public key for use in securely encoding the selected file to be transmitted. The selected file will be encoded and a communication, such as a text message or an e-mail may be sent to the receiving mobile device. The encoded file may be attached to the transmission. The receiving device 110 may then receive the transmission including the attached encoded file. The receiving device may then decode the transmission using a private key that corresponds to the previously sent public key. The decoded file may then be viewed by the user of the receiving mobile device. In some embodiments, the decoded file may be stored in memory on the receiving mobile device. In an exemplary embodiment, the file may be securely transmitted using direct transmission between two mobile devices. The direct transmission between two mobile devices may advantageously minimize the number of third party devices that may be privy to the secure conversation.

In the FIG. 1 depiction, a third party device 115 may be within range of the direct communication 100. The third party device may be capable of receiving the public key communication from the receiving device to the sending device. Although the public key may be associated with a private key, the determination of the associated private key from the public key may require tremendous computation to perform. For example, a public key to private key transformation may require so much computation as to render the exercise as too difficult for the third party device to perform in a reasonable time (e.g. less than one month or more). The third party device may also be capable to intercept the transmission that has the encrypted file attached. But without the private key, the intercepted encrypted file may not be decrypted by the third party mobile device 115. The AES-256 symmetric key encoding of the file may advantageously provide privacy of sensitive files sent between two mobile devices.

Figure 2:
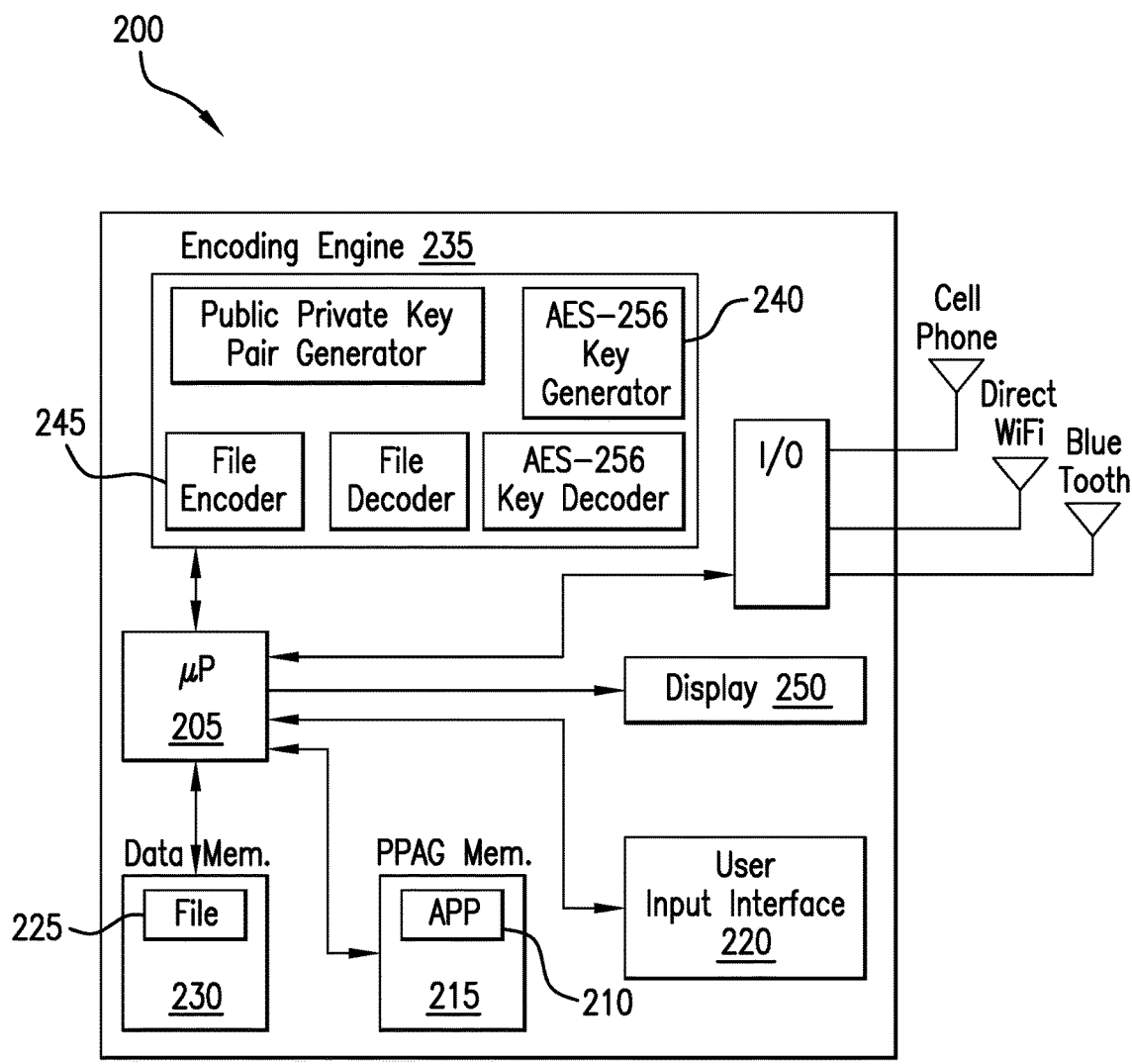
FIG. 2 depicts an exemplary block diagram of a mobile device based secure communications system that provides symmetric key encoding for files to be transmitted directly to another mobile device.

FIG. 2 depicts an exemplary block diagram of a mobile device based secure communications system that provides symmetric key encoding for files to be transmitted directly to another mobile device. In the FIG. 2 depiction, a secure direct communications system 200 includes a microprocessor 205. The microprocessor 205 may run retrieve a secure communications APP 210 from program memory 215. When running the APP, the microprocessor may receive user inputs from a user input interface 220. The user, for example, may select a file 225 to be encoded. In response, the microprocessor may retrieve the selected file 225 from data memory 230. The selected file 225 may then be sent to an encoding engine 235 for encoding. The encoding engine 235 may generate an AES-256 key using a key generator module 240 for encoding and decoding the selected file. The encoding engine 235 may then encode the selected file 225 using a file encoder module 245.

In some embodiments, a fixed private password is embedded in the APP. In some embodiments, the fixed private password acts as an encryption key. The fixed private password may be identical for all APPs downloaded. In this way, the fixed private password may not need to be transmitted, as it may already reside embedded within the APP of the receiving device, for example. In some embodiments, the fixed private password may be used to encode a file for transmission. In an exemplary embodiment, the fixed private password may be used to decode a received file. In some embodiments, the fixed private password may be used for both encoding and decoding operations.

The microprocessor may then establish a direct communication with a second mobile device running the APP using one of the direct communications protocols common to the two mobile devices. For example, the user may select, using the user input interface, to communicate using Direct Wi-Fi protocols. In an exemplary embodiment, the user may select Bluetooth as a direct communications channel. In some embodiments, the user may select Near Field Communication (NFC) as a direct communications channel. In an exemplary embodiment, the users, may transfer the public key using an optical encoding protocol. The users, for example may encode the public key using a Quick Response (QR) code. The QR encoded public key may then be transferred non-optically using the selected direct communications path. In an exemplary embodiment, the QR encoded public key may be transmitted optically using an optical input device on a receiving mobile device and a display device on the sending mobile device. In some embodiments, such optical transmission may be used to transfer the AES-256 code from a sending mobile device to a receiving mobile device.

After the sending mobile device receives the receiving mobile device's public key, the microprocessor 205 may send the received public key to the encoding engine 235. The encoding engine may then encode the AES-256 key used to encode the selected file. This encoded AES-256 symmetric key may then be transmitted to the receiving mobile device using the selected direct communications link previously established. The encoded file 225 may also be transmitted as a stand-alone file or as an attachment to another transmission. For example, the microprocessor may send the encoded file 225 as an attachment to an e-mail transmission. In an exemplary embodiment, the microprocessor may send the encoded file 225 as an attachment to a text message.

The microprocessor 205 of the receiving mobile device may then receive both the encoded AES-256 key and the encoded file. The receiving microprocessor 205 may send these received files to its encoding engine 235. The encoding engine may decode the AES-256 key using the private key associated with the previously sent public key. The encoding engine may then decode the encrypted file using the decoded AES-256 key. The microprocessor may then receive the decoded file from the encoding engine. The user of the receiving mobile device may select to display the received decoded file on a display 250, for example. The file may be stored in data memory 230 by the microprocessor 205 in response to a user input, for example.

Figure 3:
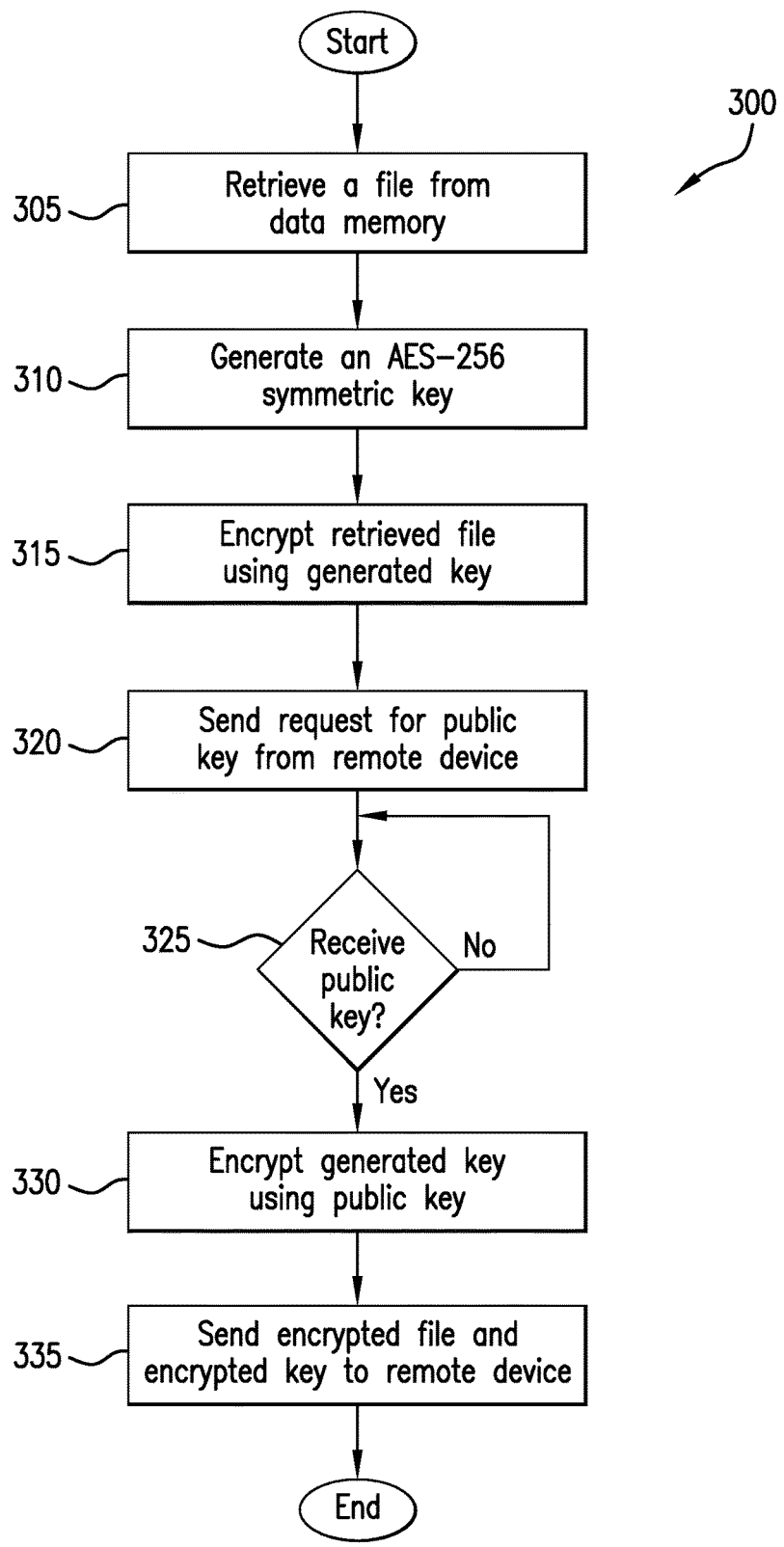
FIG. 3 depicts an exemplary flow chart of a sending device of encrypted files.

FIG. 3 depicts an exemplary flow chart of a sending device of encrypted files. FIG. 3 depicts an exemplary file encoding/sending operation 300 from the vantage point of a sending mobile devices microprocessor 205. The microprocessor 205 first retrieves a file from data memory 305. The retrieved file may have been selected by a user of the mobile device, for example. The microprocessor 205 then generates an AES-256 symmetric key for use in both encoding and decoding the selected file 310. The microprocessor 205 then encrypts the retrieved file using the generated AES-256 symmetric key 315. After encrypting the retrieved file, the microprocessor 205 then sends a request to the receiving mobile device for the mobile device's public key for use in encrypting the AES-256 symmetric key 320. The microprocessor 205 then waits for the public key to be received 325. After receiving the public key for the receiving mobile device, the microprocessor 205 then encrypts the generated AES-256 symmetric key using the received public key 330. The microprocessor 205 then sends the encrypted file and the encrypted key to the receiving mobile device 335.

In some embodiments, the AES-256 key is generated for each transmission. In an exemplary embodiment, each encoded file uses its own generated AES-256 key. In some embodiments, an AES-256 key may be used for more than one file and/or more than one transmission. In some embodiments, a public/private key pair may be generated for each transmission. In an exemplary embodiment, each encoded file uses its own generated public/private key pair. In some embodiments, a generated public/private key pair may be used for more than one file and/or more than one transmission. Other encoding methods may be used for secure file transmission. In some embodiments, secure transmission of keys may be performed using optical transmission techniques and/or methods.

Figure 4:
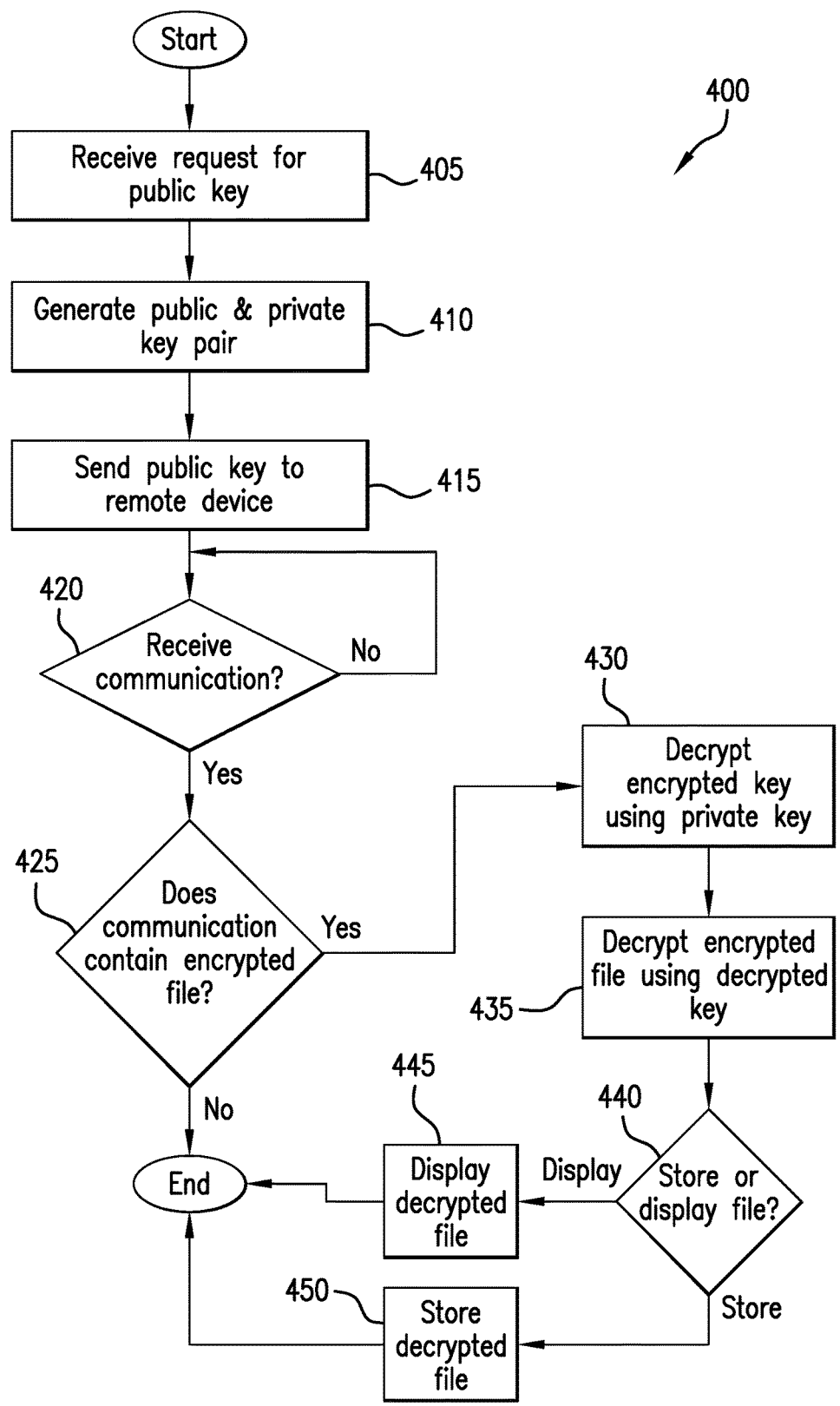
FIG. 4 depicts an exemplary flow chart of a receiving device of encrypted files.

FIG. 4 depicts an exemplary flow chart of a receiving device of encrypted files. FIG. 4 depicts an exemplary file decoding/receiving operation 400 from the vantage point of a receiving mobile devices microprocessor 205. The microprocessor 205 of the receiving device first receives a request for a public key from the sending mobile device 405. The microprocessor generates a public/private key pair for encoding/decoding the AES-256 symmetric key 410. The public key may contain information regarding how to encode the AES-256 symmetric key, for example. The private key corresponds to the public key. The private key may include information regarding how to decode the encoded AES-256 symmetric key. Although the private key contains information complementary to the private key, it may be difficult to ascertain the private key, even if one should intercept, and therefore have, the public key.

After generating the public/private key pair, the microprocessor 205 may then send the public key to the requesting sending mobile device 415. The microprocessor 205 may then wait for the encoded transmission to be received 420. After receiving the encoded transmission, the microprocessor 205 queries whether an encoded file has been attached to the transmission 425. If an encoded file is attached, the microprocessor 205 the parses and decrypts the encrypted AES-256 key from the attachment. To decrypt the encoded AES-256 symmetric key, the microprocessor uses the private key associated with the public that was used to encode it. The microprocessor 205 then uses the decoded AES-256 symmetric key to decrypt the encoded file 435. The microprocessor 205 then sends a query to the user of the mobile device asking whether the user wants to save the file and/or view the file 440. If the user wants to save the file, the microprocessor then stores the decrypted file to data memory 450. If, at step 440, the user wants to display the decrypted file, the microprocessor 205 sends a signal representative of the decrypted file to a display device 445.

Figure 5:
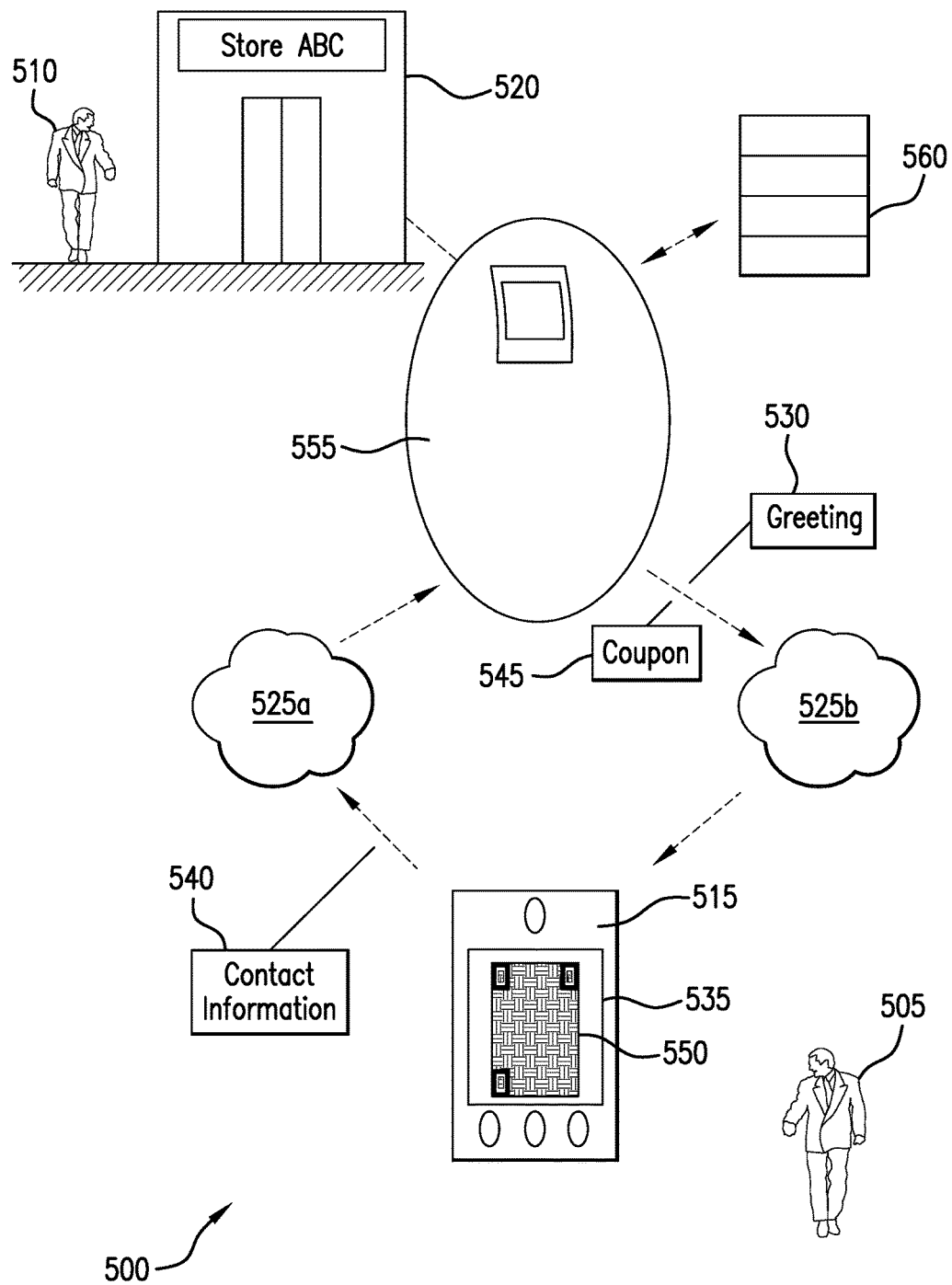
FIG. 5 depicts a diagram of an exemplary customer/business interaction system.

FIG. 5 depicts a diagram of an exemplary customer/merchant interaction system. A customer/merchant interaction system 500 may be used to facilitate a mutual exchange of information between a customer 505 and a merchant 510. This exchange of information may provide a merchant 510 with a method of gaining a customer's contact and/or other information and may provide the customer 505 with rewards, promotions, and other merchant information, for example. In various embodiments, the merchant may be able to give real-time in-situ context-responsive promotions or information to a customer. For example, the customer may communicate to the merchant that he is seeking a certain type of product which represents a small subset of the merchant's offerings. Other context narrowing information, including location and customer profile, may facilitate real-time in-situ responses by either the customer or the merchant.

In an exemplary embodiment, a customer's mobile device 515, such as a Smartphone device, may include customer-contact information. The customer may enter the premises or retail store or warehouse 520 of a merchant 110. Upon entry of the merchant's store or premises 520 a communications link 525a, 525b may be established between a merchant's short-range communications network and the customer's mobile device 515. In various embodiments, once the communications link 525a, 525b has been established, the merchant 510 and/or customer 505 may commence the sharing of information. In some embodiments, more than one communications channel may be used to establish a communications link 525a, 525b. For example, a merchant may support both Wi-Fi communications and Bluetooth communications. In some embodiments, more than one Wi-Fi zone may be supported. In various embodiments, the merchant 510 may send a welcome greeting 530 to the customer's mobile device 515 via this communications link 525b. This welcome greeting 530 may be displayed on a display window 535 of the customer's mobile device 515 along with merchant-unique branding information, such as a merchant's trademark symbol. In some embodiments, the customer's contact information 540, which he/she may have pre-authorized to be shared, may be transmitted to the merchant 510 using the communications link 525a. In some embodiments, the merchant 510 may then send the customer 505 one or more coupons 545 to be used on products or services.

In some embodiments, the contact information may be encoded using a non-industry-standard optical-coding scheme. For example, the contact information may be encoded as barcode information 550, as shown by the exemplary two-dimensional matrix. In an exemplary embodiment, the encoded contact information may include contact fields such as a first name, a last name, a phone number, a postal address, an email address, and a photograph. The customer may activate and deactivate contact fields as desired, where only the activated contact fields may be encoded in the barcode information 550 for transmission.

The barcode information 550 may be transmitted via a communication link 525a to a kiosk 555, computer, or other receiving device. The kiosk 555 connects to the merchant's computer or server 560 as well as communicating with mobile devices in the short-range network. The communication link 525a, 525b may be provided through optical or non-optical modes. The kiosk 555 may be located within a store 520 or simply be associated with a store 520. For example, the kiosk 555 may be located near the entrance of a physical store 520 such that when a customer 505 enters the store 520 (or a predetermined portion thereof), and the kiosk 555 may transmit a request message. In response to the request message, the mobile device 515 may activate a mobile-device app (APP) that operates in accordance with the contact-exchange functionality described herein, and prepare to transmit an encoded contact information message to the kiosk 555. As such, the customer may effortlessly transmit his/her encoded contact information via transmission of the barcode information 550 through the communication link 525 to the kiosk 555. In another example, a series of kiosks may be located in a neutral or remote location, where each kiosk may be associated with a particular store or defined zone, department or region within the store. A customer may choose with which kiosk associated with a particular store to share selected elements of contact information.

Figure 6:
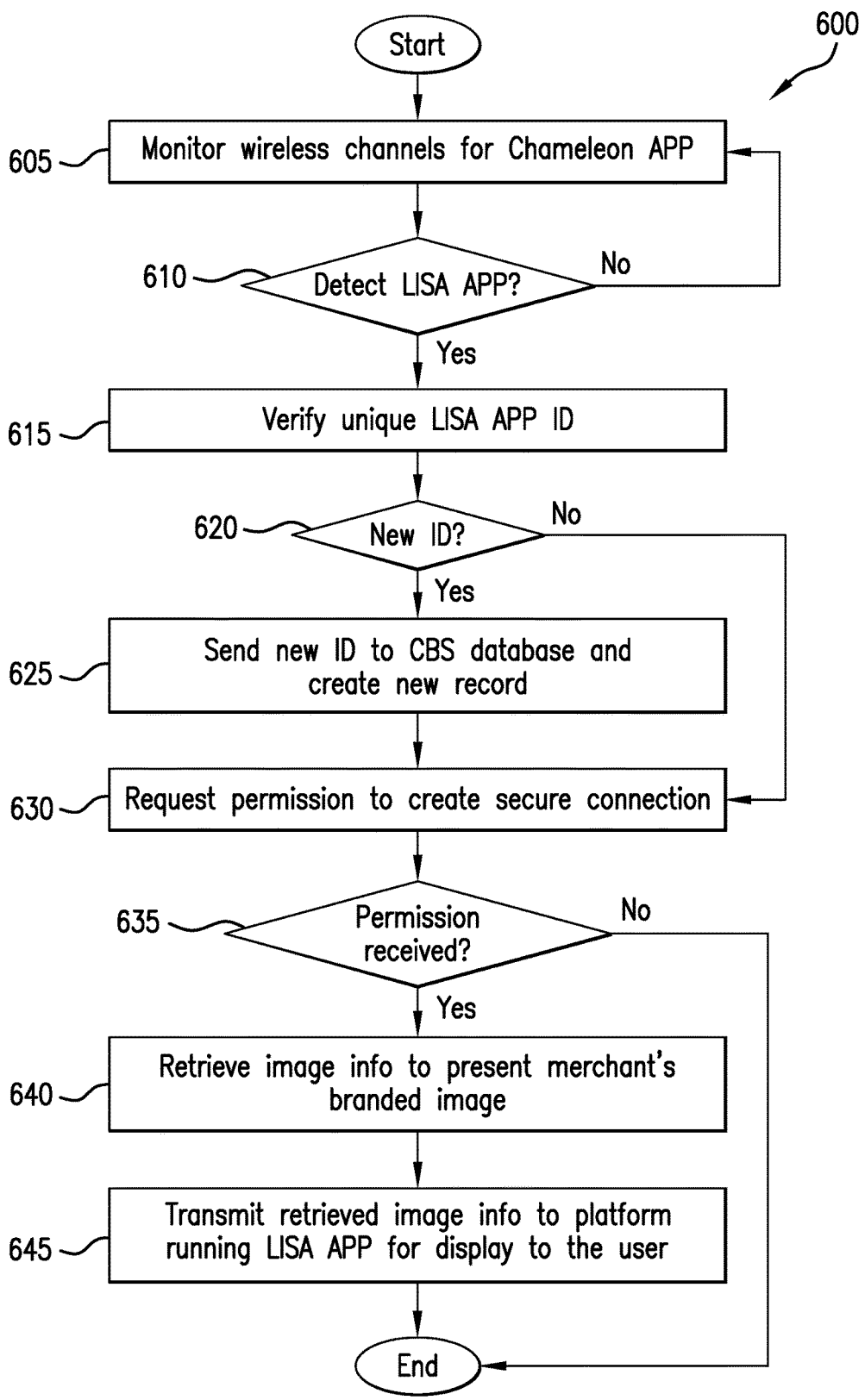
FIG. 6 depicts a flowchart of an exemplary method of a merchant's establishment of a short-range communication's link with a customer's mobile device having the ASKLINDA APP.

FIG. 6 depicts a flowchart of an exemplary method of a merchant's establishment of a short-range communication's link with a customer's mobile device having the ASKLINDA APP. In the FIG. 6 embodiment, a method 600 of establishing a customer/merchant secure connection using Chameleon rebranding is shown. This exemplary method 600 is detailed from the vantage point of the merchant processor 560. The method 600 begins at step 605 by the merchant computer 560 monitoring the short-range network, which may have a range limitation that is substantially commensurate with the store's public confines. In some embodiments, the merchant processor 560 may have the kiosk 155 periodically send a ASKLINDA APP query, asking if a mobile device with the ASKLINDA APP is within range. In other embodiments, the user may preconfigure the ASKLINDA APP to periodically sense a Wi-Fi network, and when sensing a new network, querying the network for ASKLINDA APP compatibility.

If the merchant processor detects a mobile device having the ASKLINDA APP, then the merchant processor queries the device for a unique APP identification number at step 610. If the merchant processor does not detect a mobile device having the ASKLINDA APP, then the method returns to step 605. At step 615, the merchant processor verifies that the detected ASKLINDA APP is associated with a unique ASKLINDA ID (such as a MAC address). The APP services performed by the merchant processor may then compare this ID with a merchant database of ID numbers to see if this user is new to the merchant. If the ID number is new at step 620, then the APP services creates a new record in the merchant's database and relates it to this new ID number at step 625. However, if the ID number is not new or after step 625, the merchant processor reads the record contents. Then, at step 630, the merchant processor's APP services requests the permission of the user of the ASKLINDA APP running on the mobile device with this ID number to enter into a secure communication with the network. If the merchant processor receives a signal from the ASKLINDA APP to grant permission, then the merchant processor establishes a secure communications link at step 640. The merchant processor then retrieves images and/or product information to present the merchant's branding information to the ASKLINDA APP for display on the user's mobile device at step 640. These images and information are then transmitted at step 645 to the mobile device with the unique ID number for presentation on the display of the mobile device. After such an exemplary connection is established, the merchant and customer may each communicate with each other as is provided by the merchant's APP services and supported by the mobile device's ASKLINDA APP. If, however, at step 635, the merchant processor does not receive a signal from the ASKLINDA APP to grant permission, then the method terminates.

Figure 7:
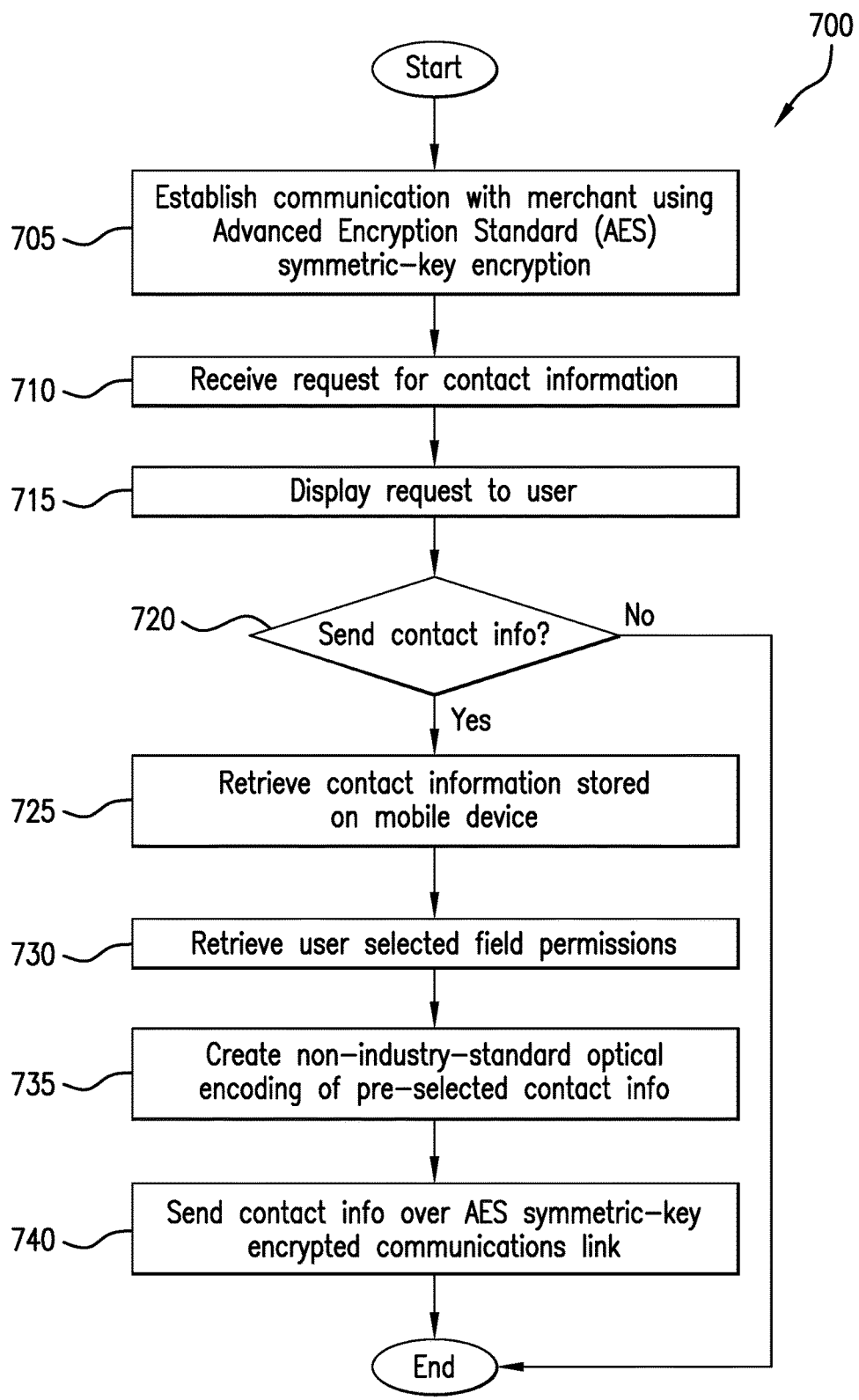
FIG. 7 depicts a flowchart of an exemplary method of doubly encrypting sensitive customer-contact information.

FIG. 7 depicts a flowchart of an exemplary method of doubly encrypting sensitive customer-contact information. In the FIG. 7 embodiment, a method 700 of doubly encrypting sensitive customer-contact information is depicted. The method 700 is depicted from the perspective of the user's mobile device. The method 700 begins as the mobile device establishes of a secure communications link between the mobile device of the user and the merchant's short-range network in step 705. In this embodiment, the network encryption uses an Advanced Encryption Standard (AES)

with symmetric keys. This symmetric-key encryption standard may require both the mobile device and the merchant's network to have the same key for encoding and decoding transmitted data. The mobile device then receives a request from the merchant processor for the contact information of the user associated with that mobile device in step 710. The mobile device then displays the request on the display screen of the mobile device for the user to see and process at step 715. Then at step 720, the mobile device then waits for the user's permission to send his/her contact information to the merchant. In some embodiments, an audible bell may accompany the displayed request to alert the user of the mobile device as to the request. In some embodiments, a voice may articulate the request using the speakers of the mobile device or those speakers connected to or in communication with the mobile device.

If the mobile device receives the user's permission to share his/her contact information with the merchant, the ASKLINDA APP then retrieves the stored contact information from the mobile device memory at step 725. Next, the mobile device retrieves the user's pre-configured contact field permissions from the mobile-device memory at step 730. The mobile device then encodes the user's contact information that he/she has pre-selected as being sharable with the merchant at step 735. Then at step 740, the mobile device then again encodes the optically encoded user-preselected contact information using an AES symmetric-key encryption standard and sends the double encode contact information over the short-range network communication link. If, back at step 720, the mobile device does not receive the user's permission to share his/her contact information with the merchant, the method ends.

Figure 8:
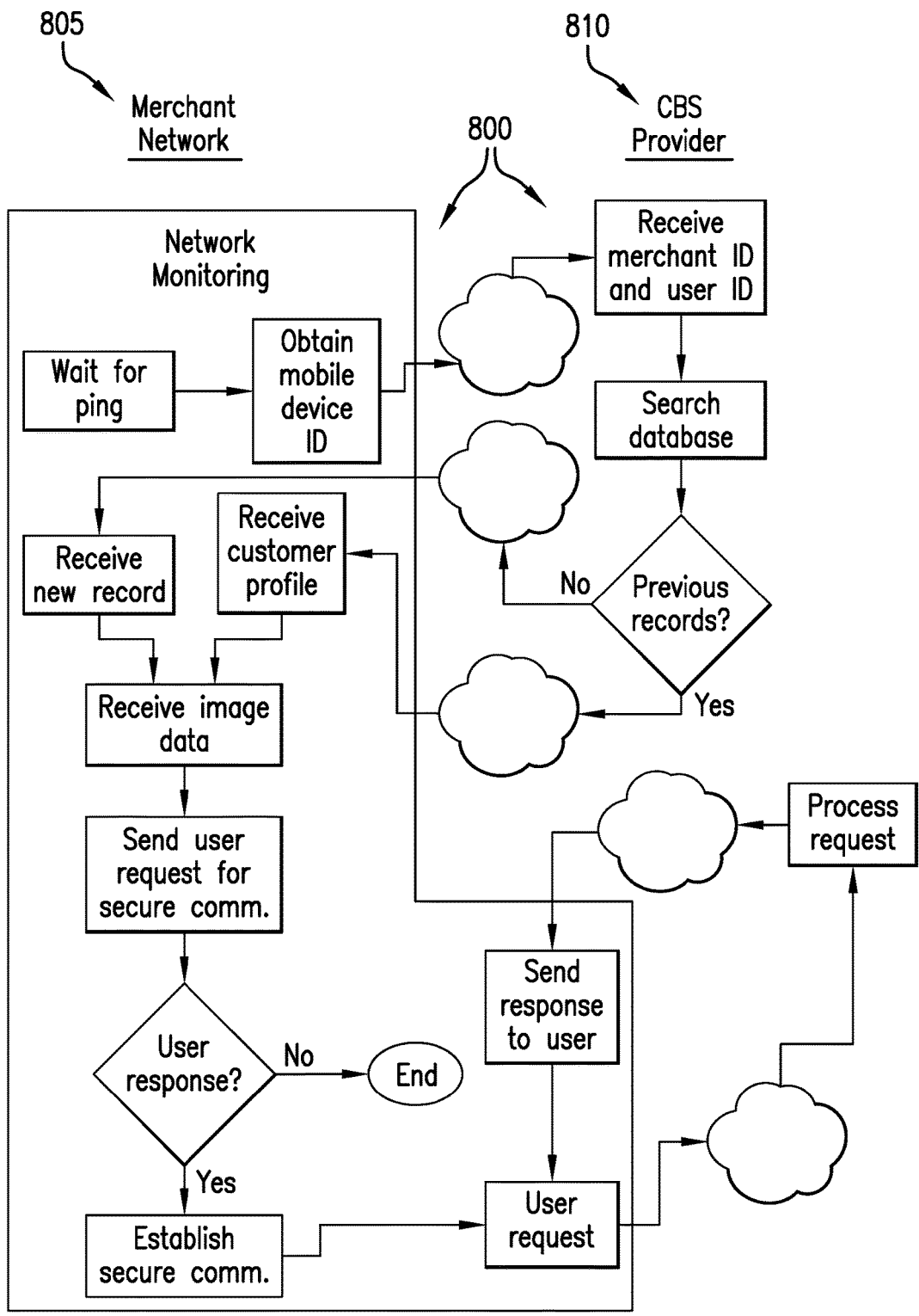
FIG. 8 depicts an exemplary method of AskLINDA Connect Enterprise System (CES) support for communication between a network-supporting merchant and a customer using the AskLINDA APP.

FIG. 8 depicts an exemplary method of ASKLINDA Connect Enterprise System (CES) support for communication between a network-supporting merchant and a customer using the ASKLINDA APP. A merchant may choose not to fully support the APP services on a merchant's server, but may choose to subscribe to services offered by a ASKLINDA CES provider 810. In the FIG. 8 embodiment, a method 800 of facilitating merchant/customer information exchange by remote ASKLINDA CES support is depicted from the perspectives of the merchant network 805 and the remote CES provider. This exemplary method 800 begins by a merchant monitoring the short-range network 805, which may have a range limitation that is substantially commensurate with the store's public confines. The exemplary method 800 begins when the customer is found to be located within the range of the short-range network of the merchant. The merchant may detect a ASKLINDA APP ping originating from a mobile device that is within the short-range network boundaries. The ping may have a unique ID corresponding to a unique mobile device. The merchant then sends both a unique merchant ID and the unique mobile-device ID to the ASKLINDA CES provider. The ASKLINDA CES provider receives a transmission identifying a unique merchant number and a unique mobile-device number. The provider then searches the database for records with both received merchant ID and user ID combination. The merchant then waits for a response from the provider. The merchant either receives a record of the customer profile associated with the merchant or a new record if the mobile-device ID has not previously been associated with the merchant. The merchant also receives from the provider image data and ASKLINDA APP data that is specific to the merchant's business, such as branding and product information.

The merchant then sends a request to the mobile device to establish a secure communications link. The merchant then waits for an affirmative response to the request, and when such a response is received, the merchant sends the provider-supplied image data and ASKLINDA APP data to the mobile device. The merchant then waits for a communication from the mobile device. After the merchant receives a communication from the mobile device, the merchant transmits the communication to the provider. The merchant then waits for a response from the provider. After receiving a response from the provider, the merchant transmits the response to the mobile device. Thus, the merchant may do little more than shuttle transmissions between the user and the provider until the user leaves the store and the short-range network of the merchant.

Figure 9:
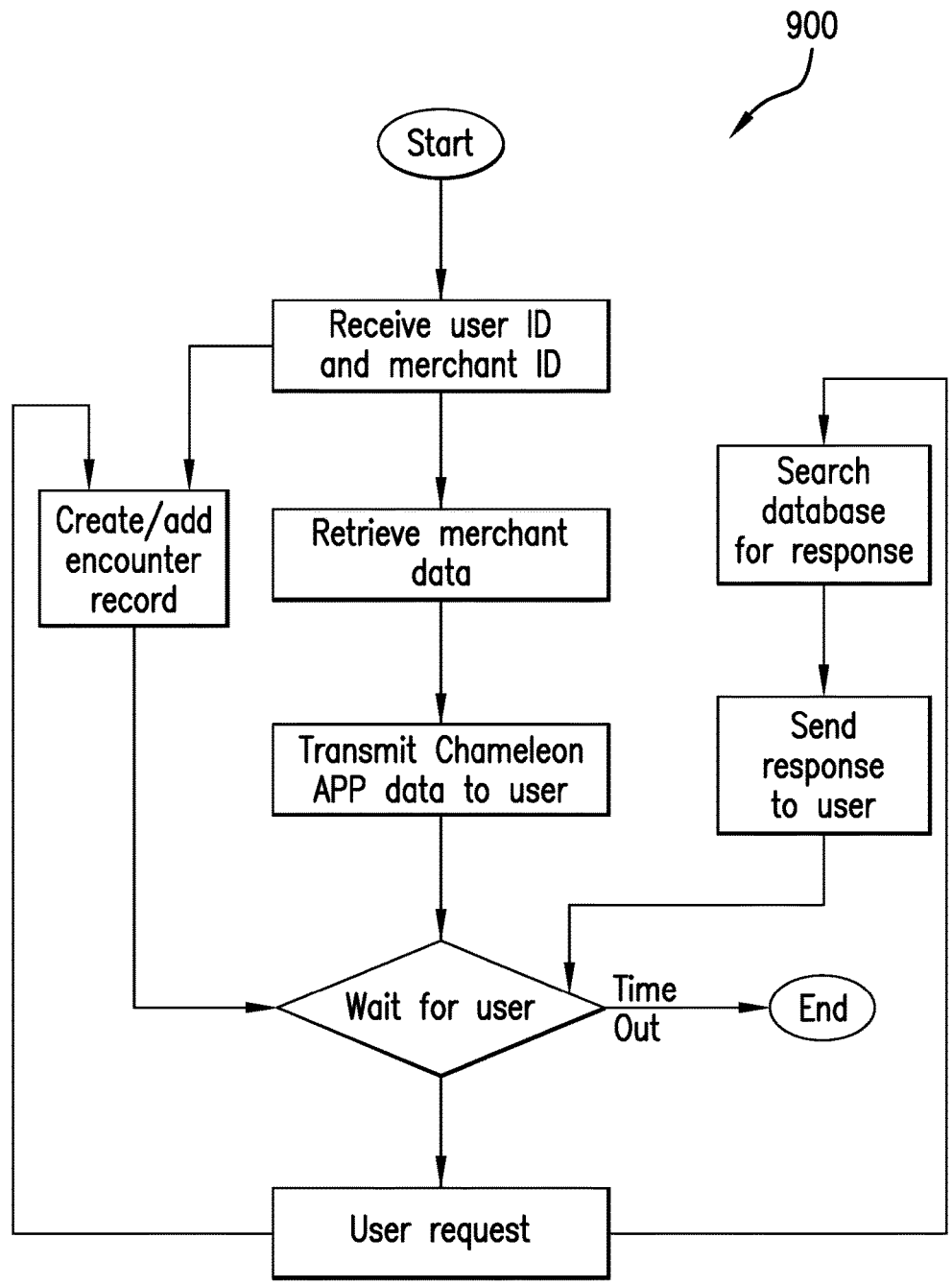
FIG. 9 depicts an exemplary method of AskLINDA CES support for communication between a non-network-supporting merchant.

FIG. 9 depicts an exemplary method of ASKLINDA CES support for communication between a non-network-supporting merchant. In some embodiments, a merchant need not provide or support a short-range network. In the FIG. 9 embodiment, a method 900 of facilitating merchant/customer information exchange by remote ASKLINDA CES support is depicted from the perspective of the provider. For non-network-supporting merchants, the user of the ASKLINDA APP may either identify the merchant in whose store he/she wishes to shop, or the location of a mobile device may indicate in which store the user of the device is located. In such non-network-supporting locations, the communication may be performed through the cellular network of a phone carrier, for example. The merchant need not provide any direct communications support for this information exchange method 900, for example.

This exemplary method 900 begins with the provider receiving a transmission from a customer identifying a unique mobile-device number, and either a customer specified merchant or a mobile-device location. In this exemplary method, encoded customer-contact information may accompany the initial transmission by the mobile device. The provider the searches the database to retrieve merchant specific ASKLINDA APP support data, such as branding and product information. The provider then transmits to the mobile device ASKLINDA APP data that is specific to the merchant, such as branding data and product information, for example. The provider also generates a record of the instant merchant/customer encounter, and associates it both with the merchant and the customer. The provider then waits for a transmission from the mobile device. The provider eventually may receive a transmission from the mobile device. The provider may then determine the proper response to the transmission, and will respond appropriately. For example, the mobile-device request may ask for the location of a specific product, to which the response would be a map indicating the product location, for example, as predefined by the merchant. Or perhaps the mobile-device request may ask about product-pricing information, to which the provider will return a merchant predefined pricing response. Each time the provider receives a transmission from the mobile device, the provider both responds to the transmission in a merchant predetermined fashion and the provider stores a record of the request and associates it with both the mobile device and the merchant. The merchant then may retrieve the customer/merchant interaction data from the provider at a later time.

Figure 10:
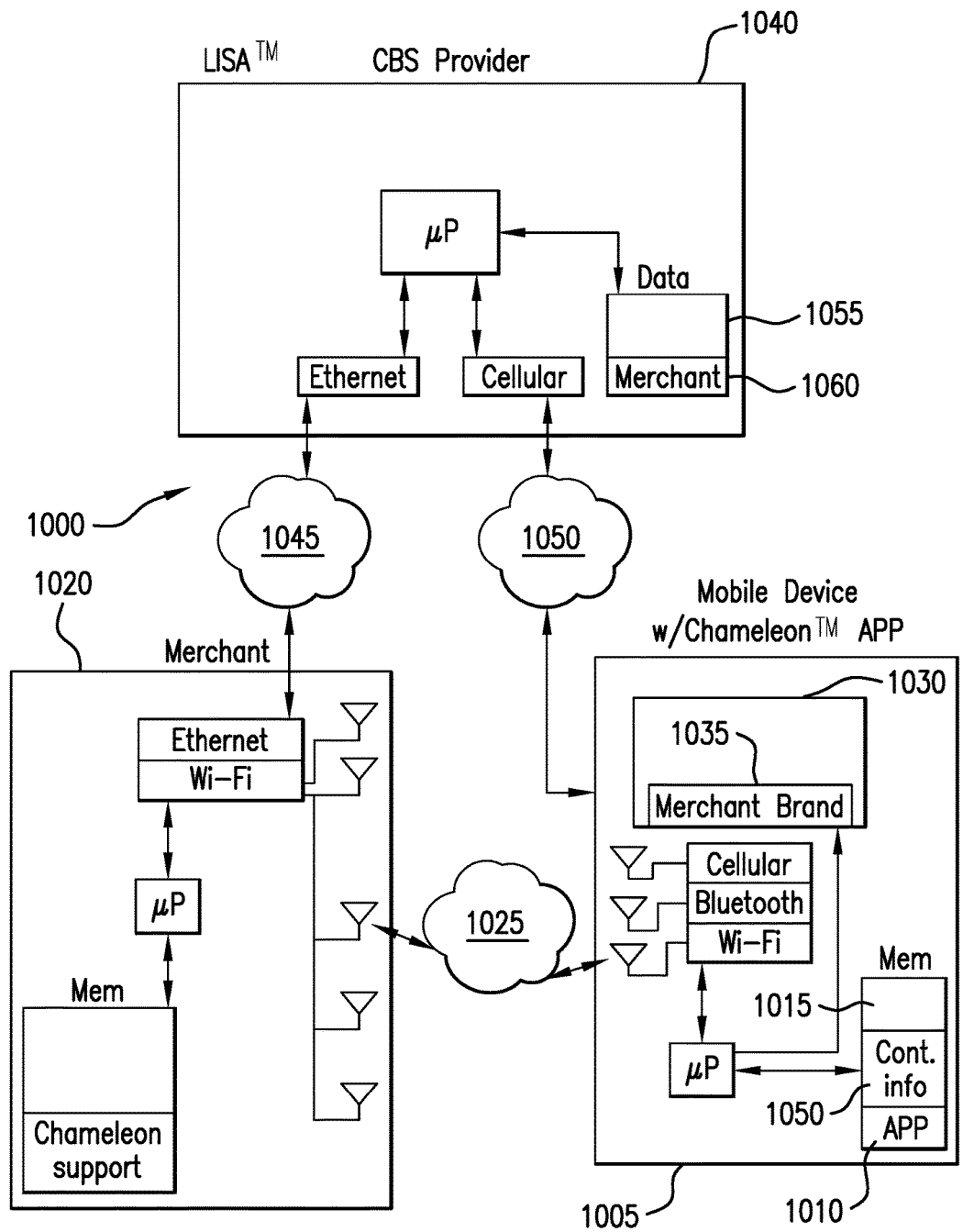
FIG. 10 depicts an exemplary block diagram of a mobile device running the AskLINDA APP and the corresponding APP services of a merchant.

FIG. 10 depicts an exemplary block diagram of a mobile device running the ASKLINDA APP and the corresponding APP services of a merchant. The FIG. 10 embodiment depicts a block diagram 1000 of an exemplary ASKLINDA embodiment. A mobile device 1005 containing an executable ASKLINDA APP code 1010 in a memory device 1015 is in communication with a merchant 1020. The communication is performed using a secure Wi-Fi communications link 1025. The mobile device 1005 has a display screen, the display contents which the ASKLINDA APP may control. In this example, the merchant specific branding information 1035 is shown. A ASKLINDA CES provider 1040 is shown in communication with both the merchant 1020 and the mobile device 1005. The merchant/provider communication is performed using an Ethernet link 1045, while the mobile-device/provider communication is performed using a cellular phone link 1050. These communication methods are exemplary and meant to be examples but not limitations, as many other communications standards may be used by various embodiments When the mobile device 1005 first establishes the secure communications link 1025 with the merchant 1020, the merchant 1020 may request the user's contact information 1050 which may be stored in the memory 1015 of the mobile device 1005. The contact info 1050 will then be retrieved and optically encoded using a non-industry-standard coding method. The encoded contact information may then be transmitted to the merchant 1020 over the already established secure communications link 1025, with the mobile-device user's approval. The merchant may the send the user's contact information 1050 along with a unique merchant ID to the ASKLINDA CES provider 1040 over the Ethernet communications link 1045. The ASKLINDA CES provider may then search a database 1055 for any merchant/customer history 1060. The ASKLINDA CES provider 1040 may then transmit this record back to the merchant 1020 over the Ethernet link 1045. In some embodiments, the mobile device 1005 may directly communicate with a ASKLINDA CES provider 1050. In this embodiment, a cellular communications link 1050 is shown as the direct communications link between the mobile device 1005 and the ASKLINDA CES provider 1040. In embodiments where a merchant does not support direct communications between that merchant and the mobile device 1005, the ASKLINDA CES provider 1040 may directly transfer the merchant-specific branding information 1035 to the mobile device 1005 for display on the display screen 1030.

Figure 11:
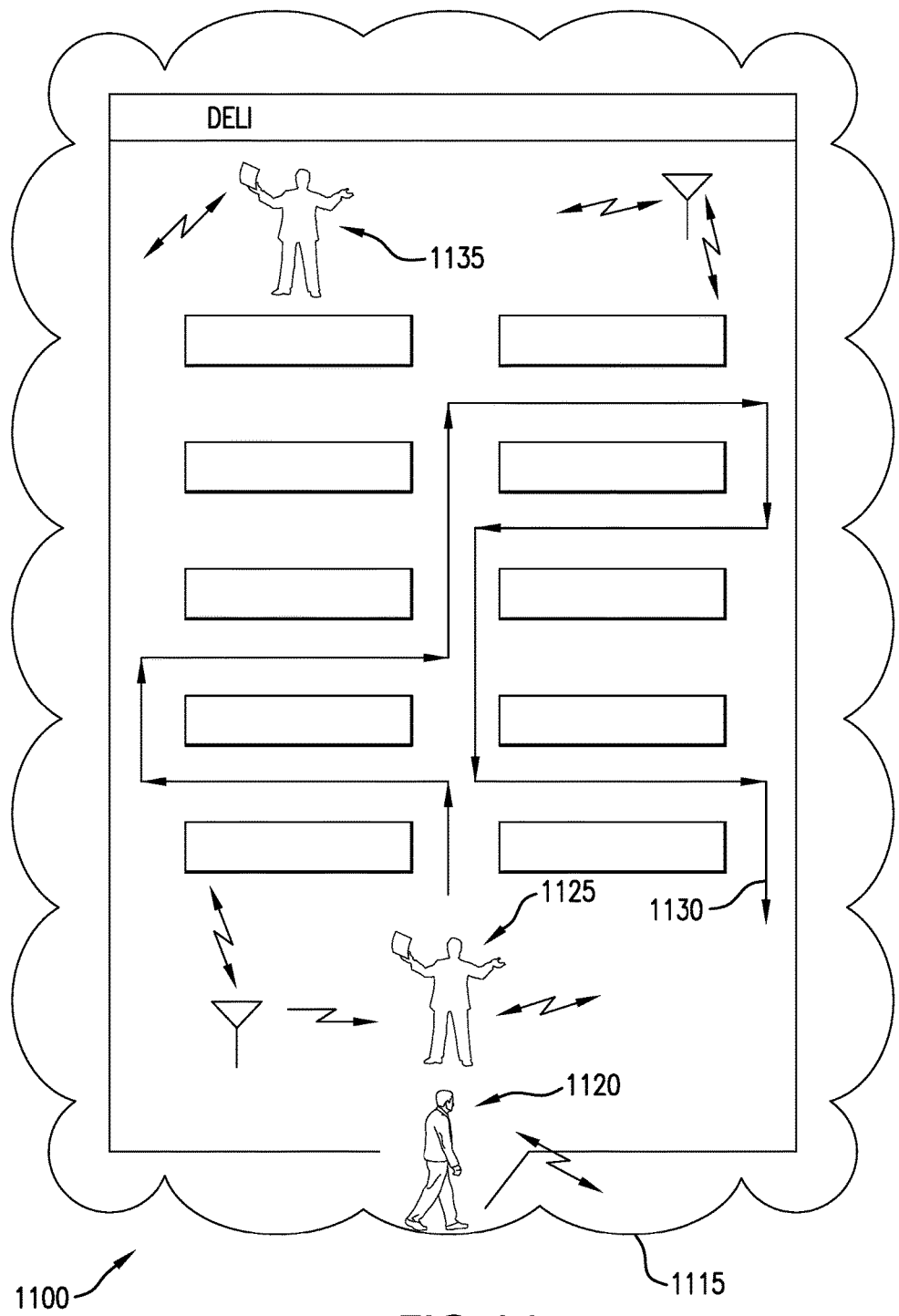
FIG. 11 depicts a schematic diagram of an exemplary use of the AskLINDA APP in a merchant store.

FIG. 11 depicts a schematic diagram of an exemplary use of the ASKLINDA APP in a merchant store. In FIG. 11, and exemplary merchant/customer encounter 1100 is schematically depicted. The encounter begins with a user 1105 who has a mobile device which is running the ASKLINDA APP entering into the short-range network boundary 1115 of a store. The communications link may be established immediately after customer's entry 1120. Shortly thereafter, the customer-contact information may be securely transmitted to the merchant through the short-range network, and the merchant may transmit ASKLINDA APP data containing merchant-unique branding data and product information. In this example, the merchant may transmit a flyer containing this week's sale items to the user, along with coupons and specials which are offered only to ASKLINDA APP users.

The merchant/customer encounter 1100 continues with the customer examining 1125 his/her previously created shopping list. For example, the user may have a grocery list that he/she created by modifying the grocery list he/she used in the previous week. The user may then request an optimal path 1130 through the store from the merchant using the ASKLINDA APP. The merchant then responds with a map depicting the route through the grocery section of the store that passes by every item on the list. The merchant then may analyze the grocery-list information supplied by the customer to generate suggestions for complimentary food products. The merchant then sends one or more coupons to the user's mobile device for these complementary items that are not on the original grocery list. For example, if the user had brats and buns on his/her list, the merchant may suggest pickled relish and mustard. The merchant may also evaluate whether all of the items on the grocery list are currently available, and if not, the merchant may send the mobile device a message stating that the unavailable item is currently out-of-stock and a future date when the item should be back in-stock.

The merchant/customer encounter continues with the customer scanning the bar-code of a device to obtain nutrition or pricing information. The merchant responds to this request with the appropriate nutritional or pricing information. The merchant may also send the mobile device the pricing or nutritional data of similar items for customer comparison. The merchant may obtain location information of the customer's mobile device, and when the customer deviates from the path that was suggested to him by the merchant, the merchant may respond. For example, the merchant may take note that the customer may be located at the deli counter 1135. The merchant may respond by sending the customer a coupon for a deli product, for example. As the customer nears completion of his/her grocery list, the merchant may note that the locations of the many in-store ASKLINDA APP users indicate that more check-out assistance is needed. The merchant may reassign its employees in response to this need.

Then when the customer checks out, if he uses a coupon or permits the scanning of his ASKLINDA APP generated bar code, the merchant may associate this purchase with this merchant/customer encounter. The merchant may then compare the actual purchase to the pre-purchase grocery list. This and other Big Data information can be used for myriad business purposes. For example, if a relatively high percentage of ASKLINDA APP users fail to purchase a particular item that is common to their lists, perhaps the stocked item is an unpopular brand or priced uncompetitively, for example.

Another exemplary application of the ASKLINDA APP involves the facilitating of information exchange between a university and a student. The University may communicate with the student while he/she is on campus. The student may have preconfigured the ASKLINDA APP to automatically send the student-contact information whenever the student enters the campus grounds. This communication may be performed using a local-area network or a cellular telephone network. The university may then respond to the campus entry of the mobile device by sending the student's class schedule for the day for display using the ASKLINDA APP, for example. The student may then send the university a request for certain library books using the ASKLINDA APP. The university may respond that the books are on hold for pick-up by the student. The student may then request the lunch menus at the various campus cafeterias. The university may then respond with the menu and pricing information in response to the user's request.

The instructors at the university may set up ASKLINDA APP pages that may be used by the user of a mobile device. These pages may facilitate the submission of homework and the reporting of grades, for example. A student may send a request to his/her university professor's ASKLINDA APP support services for the upcoming homework assignment. The response from the university's ASKLINDA APP support services may be the assignment details as well as the due date. The student may then submit the finished assignment document that may be stored on his/her phone to his/her professor's ASKLINDA APP support services. The ASKLINDA APP support services may respond with a receipt of the submitted assignment.

The university may use the student location information to provide better security and for future planning purposes. The university may provide an emergency feature in its custom ASKLINDA APP GUI. This emergency feature may provide an easy way for a student to report that he/she is in danger. The location information may provide a security officer the position information of the student which may minimize the response time of the officer.

Another exemplary application of the ASKLINDA APP facilitating the exchange of information may involve a hospital/patient setting. The hospital may issue a mobile device with the ASKLINDA APP preinstalled to patients who do not already have such a mobile device. The ASKLINDA APP will then be programmed with the contact information of the patient which will be transmitted to the hospital when the mobile device is first issued to the patient. The hospital can then track the location of the patient within the hospital building using the location information of the mobile device, such as its GPS positioning system. The mobile device may have a Bluetooth capability or a Wi-Fi capability that may be used to securely connect to a medical monitoring device with wireless connection capabilities. For example, a heart monitor may transmit its measurements to the mobile device, which is associated with the patient. The hospital configured ASKLINDA APP may be programmed by the hospital with threshold values of monitored heart metrics. Should one of the monitored metrics fall outside the threshold, the ASKLINDA APP sends a transmission to the hospital alerting the staff of the metric that is out of bounds, the monitored value, and the location of the patient.

The patient may be able to access the hospital menu that has been prescreened by the hospital as to the patient's dietary restrictions. The patient may then order his/her meals for the day using the ASKLINDA APP. The hospital may respond to the order with a confirmation of its reception and a schedule as to the patient's expected meal time. The patient may then send a request to the nurse to pick up his food tray or request other nursing assistance, for example.

In an exemplary scenario, one user may want to transfer one or more files to another user. The first user may select or create the documents that will be transferred. The user may first exchange contact information that has been encoded using an optical encoding protocol. The optical encoding protocol may be a non-standard encoding protocol, in some embodiments. In some embodiments, the contact exchange may be performed using a non-optical communications channel. In some embodiments, the contact exchange may be performed using an optical means. In an exemplary embodiment, one user may use a camera on the mobile device to capture a displayed bar code on the other mobile device, for example. In some embodiments, the contact information may include a decoding key for use in decoding files transmitted by the mobile device associated with the contact information. The files selected for transmission may be encoded using an encoding protocol. The files may be exchanged using a wireless communication channel, for example. In some embodiments, the files may be exchanged using an optical communications channel. The exchanged files may then be decoded using a decoding key included in the previously exchanged contact information.

In some embodiments, the decoding key may be associated only with a single file transmission. In some embodiments, the decoding key may be associated with all transmissions form a particular contact associated with the decoding key. In some embodiments, the transmitting user may select the modality of a decoding key. For example, a user may assign a specific decoding key to one or more files. In some embodiments, the user may select a decoding key for all transmissions from that user to a specific receiver. In some embodiments, the user may select a decoding key for use with all transmissions to all users, for example. In some embodiments, no decoding key will be transmitted in the contact information. For example, some embodiments may provide Advanced Encryption Standard (AES) symmetric-key encryption, using standard communications protocols, such as, for example, using industry standard key exchange protocols.

In another exemplary scenario, a user may desire to share photos with a group of individuals. The user may select the members of the group by selecting optically encoded contact information of the members that were previously exchanged. The photos may be encoded using an industry standard encoding method, and the files sent to the selected recipients. Double key encryption may be used for each transmission. In some embodiments, the double key encryption may be an industry standard encryption protocol. In some embodiments, a non-standard double key encryption may be used. In an exemplary embodiment, one key may be associated with the sender and one key may be associated with each receiver. In some embodiments, the keys of the receivers may be included in the previously exchanged optically encoded contact information. In some embodiments, the sender may have a unique key associated with each of the receivers. In some embodiments, the sender may have a common key for all the receivers.

In another exemplary scenario, a user may desire to transfer a file to receiver. The user may transfer an encrypted file that contains the user's optically encrypted contact information bundled together with a message. The message may be a text file, for example. The message may be a video file, for example. In some embodiments, the message may be associated with the contact information transmitted with the message. In some embodiments, the message may be decoded using information in the simultaneously transmitted contact information, for example. In some embodiments, the contact information must be decoded prior to decoding the bundled message.

Figure 12:
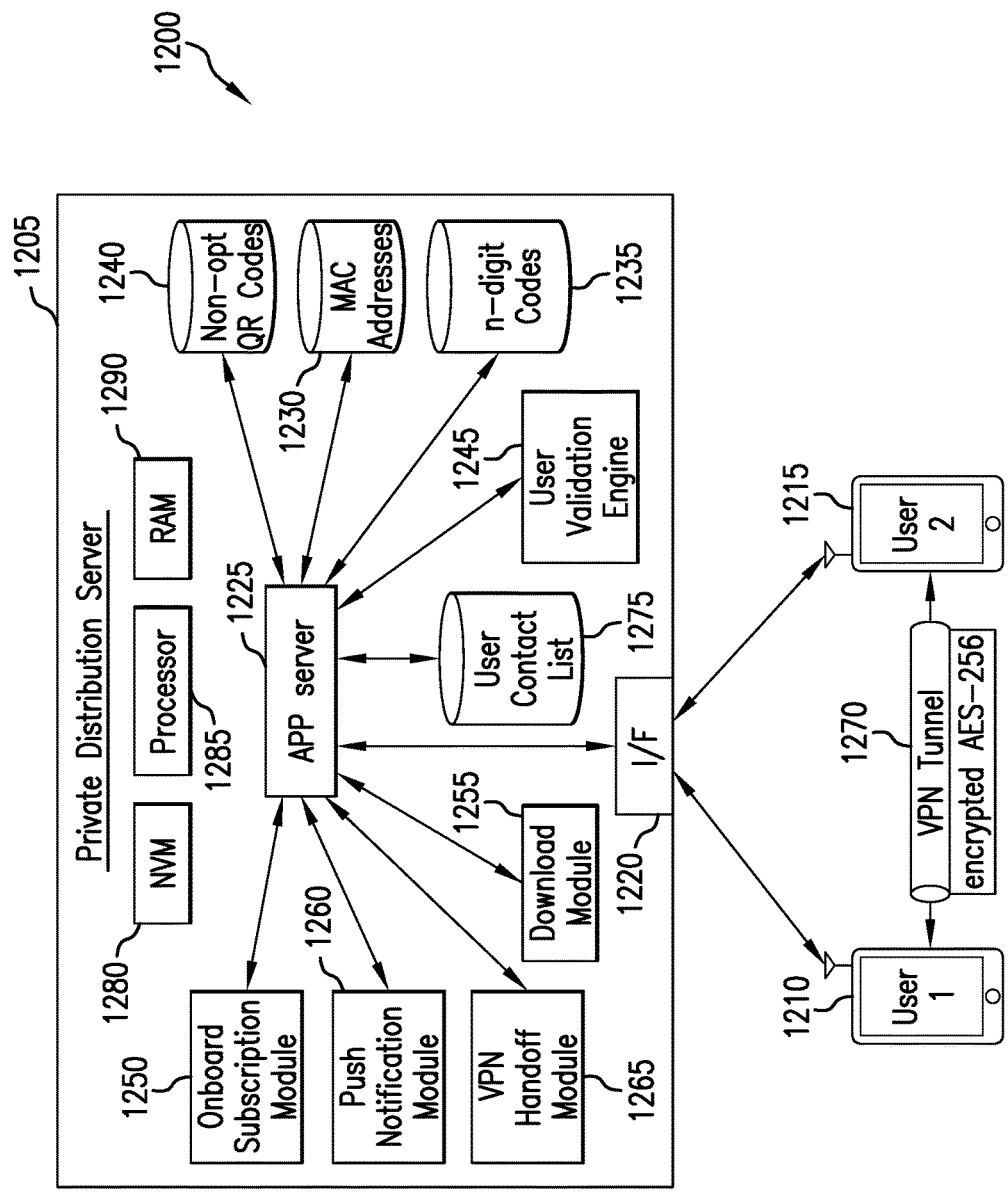
FIG. 12 depicts a schematic diagram of an exemplary private connection system (PCS) including a private distribution server (PDS).

FIG. 12 depicts a schematic diagram of an exemplary private connection system (PCS) including a private distribution server (PDS). A PCS 1200 includes a PDS 1205, which facilitates connecting various devices to one another. The PDS 1205 is configured to interface with a user 1 device 1210 and a user 2 device 1215 via PDS interface 1220. The PDS interface 1220 facilitates data transfer to and from an APP server 1225. The APP server 1225 directs the various APP functions of the PDS 1205. The APP server 1225 may be connected to, integrated with, part of, or synonymous with the PDS 1205.

The user 1 and 2 devices 1210 and 1215 each have their own respective MAC Addresses (or UDIDs) that uniquely identify each device from other devices. The PDS 1205 contains a list of MAC Addresses (or list of UDIDs) 1230. Each MAC Address in the list of MAC Addresses 1230 is assigned a corresponding n-digit alpha-numeric code in a list of n-digit codes 1235 (where in one embodiment, n=8). The PDS 1205 also stores a list of non-optical QR codes 1240, where each non-optical QR code in the list of non-optical QR codes 1240 is associated with a corresponding MAC Address in the list of MAC Addresses 1230.

In some examples, the QR codes may be kept on the PDS 1205 only for verifying the identity of the users connecting. An APP on the user's device may read the code to determine if it is a match or not. Each QR code may be assigned an 8-digit alpha-numeric identifying code in order for the PDS 1205 to identify the users connecting and to find the QR code. The QR code may be sent to the APP, which may then read the QR code and confirm it is associated with the user with which the APP will connect. In this respect, the PDS may store QR codes containing personal contact information, but the PDS may be unable to read the QR codes itself (only the connecting APP may be able read the codes).

In various embodiments, the only type of device or user identifying information the PDS 1205 may store is the list of MAC Addresses 1230 along with the associated list of n-digit codes 1235. In some examples, the PDS 1205 may store IP Addresses associated with each MAC Address in the list of MAC Addresses 1230. In some embodiments, the only information stored in the PDS 1205 may be the 8-digit alpha-numeric code, the QR code, and the MAC address of each device. However, the PDS 1205 may not know the identity of any person associated with these numbers. In some examples, the PDS does not store any other type of data that may identify a user device.

When a user device (e.g., user 1 device 1210) interfaces with the APP server 1225, a user validation engine 1245 checks that the MAC Address associated with the user device is in the list of MAC Addresses 1230. In some examples, the user validation engine 1245 may check that the non-optical QR code associated with the user device is in the list of non-optical QR codes 1240. In some examples, the user validation engine 1245 may check that the n-digit code associated with the user device is in the list of n-digit codes 1235.

In some examples, if the MAC Address associated with the user device is not in the list of MAC Addresses 1230, the user device may be prompted for permission to add its MAC Address to the list of MAC Addresses 1230. In some embodiments, if the MAC Address associated with the user device is not added to the list of MAC Addresses 1230, then the APP server 1225 does not proceed further with that specific user device. In some embodiments, if the MAC Address associated with the user device is not in the list of MAC Addresses 1230, the user device may be denied access to interface with the APP server 1225. In some examples, if the MAC Address associated with the user device is not in the list of MAC Addresses 1230, the MAC Address associated with the user device may be automatically added to the list of MAC Addresses 1230 (and may be automatically assigned an n-digit code and/or a non-optical QR code).

If the MAC Address associated with the user device is present or added to the list of MAC Addresses 1230, then the APP server 1225 proceeds to interact with the user device. The PDS 1205 includes an onboard subscription module 1250, which verifies that the particular user device has subscribed to the services of the PDS 1205. If the user device is not subscribed, then that user device may be prompted to subscribe, or may be denied access to use the services of the PDS 1205. A newly subscribed user may use a download module 1255 to download software (e.g., the PCS APP discussed in detail below) onto that user's device. This software may facilitate utilization of the various features associated with the PCS 1200.

When user 1 device 1210 sends a request to the APP server 1225 to connect with user 2 device 1215, the APP server 1225 uses a push notification module 1260 to send a push notification to the user 2 device 1215. The push notification notifies the user of user 2 device 1215 that user 1 device 1210 has requested to connect.

If the user of user 2 device 1215 approves of the connection, then the APP server 1225 utilizes a virtual private network (VPN) handoff module 1265 to connect user 1 device 1210 to user 2 device 1215. The VPN handoff module 1265 facilitates the creation of a VPN connection 1270 between user devices 1210 and 1215. Once the VPN connection 1270 is created between user devices 1210 and 1215, the devices can send/receive data to/from each other without that data being sent through the PDS 1205. In this sense, user devices 1210 and 1215 can advantageously share data in a secure and private manner without the shared data being intercepted by a "man-in-the-middle" attack taking place between the user devices 1210 and 1215 and the PDS 1205. Furthermore, a hacker who breaches the PDS 1205 will not have access to any of the data shared between the devices 1210 and 1215, since none of this shared data is stored on the PDS 1205.

In some examples, an APP on a user device may enable the device to be a P2P (Point-to-Point) connection device, where each APP individually requests and accepts requests to connect. In an illustrative example, APP User#1 initiates the request to the PDS to connect to App User#2 by sending an 8-digit alpha-numeric code and associated QR code containing the personal contact information (including cell phone number) to the PDS. The PDS then searches its database to validate the QR code stored, and validates by having the APP read the QR code and approve the contact, then checks to see if APP User#2 is connected. If connected, the PDS allows the connection to pass through for APP User#2 to receive and accept connection. If APP User#2 is not connected the PDS sends a push notification to the mobile device to inform and request permission to connect.

In some examples, the types of data shared between the devices 1210 and 1215 may include music and video files. In some examples, the types of data shared between the devices 1210 and 1215 may include emails, email attachments, and text messages. In some examples, only the attachments may be encrypted and readable by a user's APP. When requested to open the attachment, a prompt may appear reading: "Open by APP?" If "YES" is selected, the APP opens the message, which can then be read. If "NO" is chosen, and someone tries the read the attachment either on a desktop computer or mobile device straight though the email provider, that attachment may not be accessible (as it is encrypted). In some examples, the types of data shared between the devices 1210 and 1215 may include any data type or data format (e.g., MP3, XML, JPG, WMV, ZIP, DOC).

In some examples, the VPN connection 1270 may employ AES-256 encryption to send data between user 1 device 1210 and user 2 device 1215. In some embodiments, the VPN connection 1270 may employ other types of encryption. In various embodiments, two or more devices may be connected via the VPN connection 1270. In some examples, the VPN connection 1270 may be a multi-party/multi-device connection.

In some examples, the contact lists for the user devices 1210 and/or 1215 may be stored on the PDS 1205 in a user contact list module 1275. In some examples, the user contacts stored in the user contact list module 1275 may be encrypted.

The PDS 1205 includes computer memory components for storing data and program instructions. As depicted, the PDS 1205 includes a non-volatile memory 1280 and a random-access memory 1290. The PDS 1205 also includes at least one processor 1285 for executing program instructions. The PDS 1205 also has at least one input/output component (e.g., interface 1220) for sending/receiving data to/from the PDS 1205.

Figure 13B:
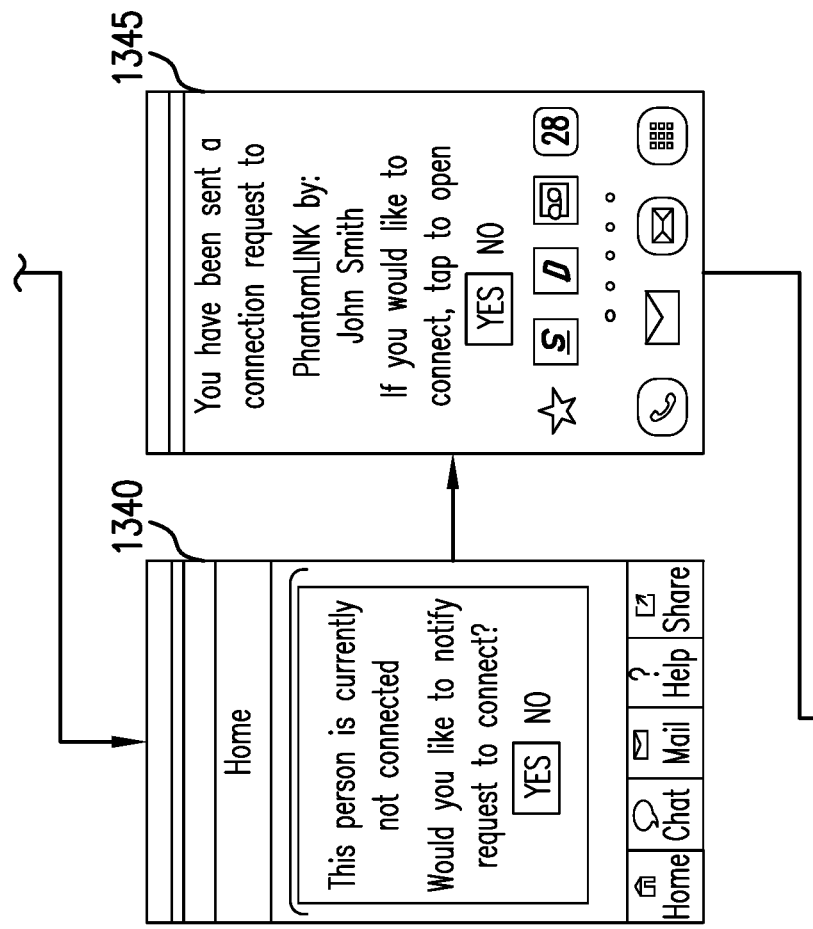
Figure 13C:
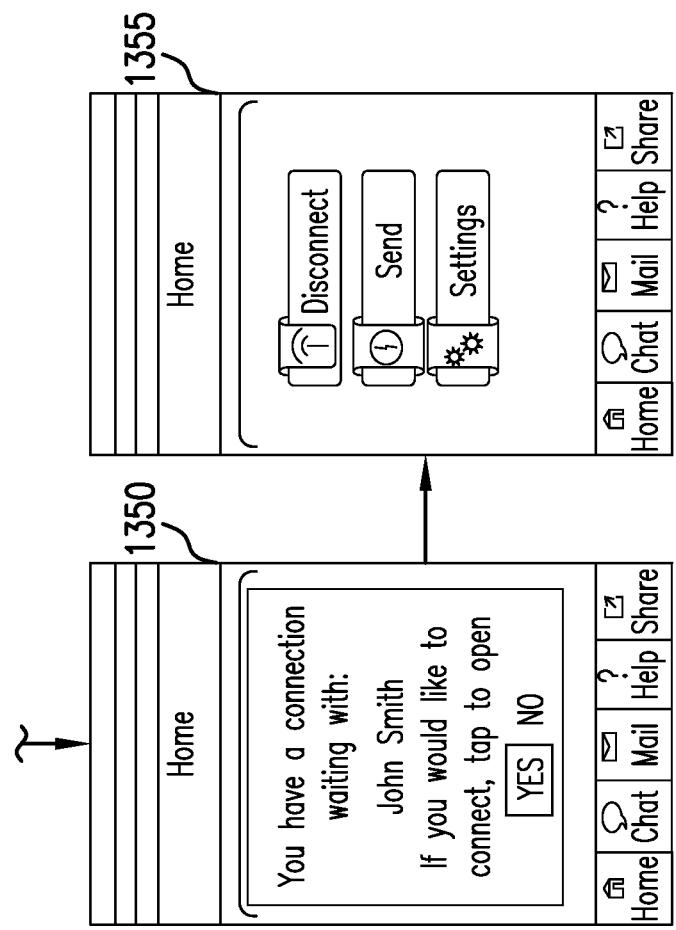

FIGS. 13A, 13B, and 13C depict various states of an exemplary private connection system application program (PCS APP) user interface. Various states 1300 of the PCS APP are shown. For a new user (e.g., user 1) who has not already configured the PCS APP, user 1 connects to a PDS. User 1 then downloads the PCS APP to their device from the PDS, for example, via the download module 1255. The MAC Address and/or UDID number of user 1's device is obtained and stored in the PDS inside a non-optical QR code (NO QR).

A user (e.g., user 1) with the PCS APP installed on their device starts the PCS APP, which shows a home screen 1305 to the user. The home screen 1305 displays options for connecting, sending, and settings. The PCS APP also displays a list of main menu options, including home, chat, mail, help, and share. User 1 selects "connect" on the home screen to display a connection screen 1310. On the connection screen 1310, various options for connections are displayed, including Internet, mesh, WiFi Direct, Bluetooth, and near-field communication (NFC). In this illustrative embodiment, user 1 selects "Internet" from the connection screen 1310. In response to this selection, a screen 1315 is displayed, which allows user 1 to connect to a private cloud/connection server, or cancel the connection. In this illustrative embodiment, user 1 selects "connect" (with a check mark next to it) to directly connect to a PDS.

In an illustrative example, user 1 is then issued a n-digit alphanumeric ID number linked to the NO QR stored in both the PDS and on user 1's device. In this illustrative embodiment, user 1's contact list is then downloaded and each contact is individually stored and assigned a pre-key number in a NO QR in the PDS. In some examples, the user contact list may be the same list of information (e.g., name, address, phone) typically stored on a user's device for contacts stored. The phone number may be the primary identification used in connecting. The term "pre-key" may refer to a software term for session identification.

Now that user 1 device's MAC Address and/or UDID number is stored in the PDS (along with their n-digit alphanumeric ID number and NO QR), whenever the user 1 device connects to the PDS, the PCS APP will send the MAC Address, UDID number, n-digit alphanumeric ID number, and/or NO QR to identify user 1 device to the PDS. The PDS then checks this identifying data to validate the identity of user 1 device.

User 1 may optionally be offered to set up a speed dial list of users based on contact list phone numbers stored in the PDS. This may be accomplished by user 1 selecting "setup speed dial number" on a screen 1320 and choosing the name of a user 2 for future ease of connection. In a screen 1325, user 1 selects an unused speed dial icon to set up a speed dial for user 2. User 1 may then select user 2 from a contact list (shown in a screen 1330) to appear on user 1's speed dial list. User 2's name then appears on user 1's speed dial list (shown in a screen 1335).

A new user 2 may then enter the IP address of their device to submit to the PDS and download the PCS APP to user 2's device. Next, the MAC Address and/or UDID number of user 2's device is obtained by the PDS and user 2 device is issued an n-digit alphanumeric ID number. Similar to the steps in the preceding paragraph, user 2 may optionally set up a speed dial list of users based on contact list phone numbers in the PDS.

Once user 2 has downloaded the PCS APP and has been issued a NO QR and n-digit alphanumeric code, user 1 may then request to connect with user 2. This may be accomplished by user 1 selecting user 2 on their speed dial list screen 1335. Once user 1 selects to connect with user 2, the PDS may check to validate user 2 device's MAC Address, UDID number, n-digit alphanumeric ID number, and/or NO QR to identify user 2's device to the PDS. In this illustrative embodiment, in response to the PDS determining that user 2's device is not currently connected to PDS, the PCS APP on user 1's device displays a message to user 1 that user 2's device is not currently connected and may offer user 1 to send a push notification to user 2's device (shown in a screen 1340). If user 1 selects "yes," (e.g., accepts the offer) then user 2's device receives a push notification that they have been sent a connection request by user 1 (shown in a screen 1345). User 2 is prompted to accept or reject the connection. If user 2 selects "yes" (e.g., accept), then the PCS APP is automatically opened and user 2 is shown a home screen on user 2 device (similar to the home screen 1305). User 2 then goes through the steps stated above with regard to user 1 selecting "connect," user 2's PCS APP sending the MAC Address, UDID number, n-digit alphanumeric ID number, and/or NO QR to identify user 2's device to the PDS, and PDS checking this identifying data to validate the identity of user 2's device.

Next, the PDS recognizes that user 1 and user 2 want to connect their devices. The PDS then brokers a VPN connection between user 1 and user 2 devices. PDS notifies users 1 and 2 that they have a connection waiting with one another, and prompts them for whether they would like to open a connection. Upon users 1 and 2 selecting "yes," the devices of user 1 and 2 are now directly connected to one another via the VPN connection (shown in a screen 1355). The PDS responds by standing aside and deleting the requested inquiry. Now that user 1 and 2 devices are directly connected, they are able to advantageously send/receive data securely and privately between one another without the data being sent through or stored on the PDS. User 1 and 2 may also disconnect from the VPN connection at any time.

In some embodiments, some of the steps described with respect to FIGS. 13A and 13B may be optional or skipped. For example, the prompt shown in a screen 1350 may not take place. Instead, the VPN connection between user 1 and user 2 devices may automatically be created once user 1 has requested to connect with user 2 and once user 2 has accepted the connection. In some embodiments, users may not be required to set up speed dial lists or numbers. In some examples, the PCS APP may automatically select the connection type (e.g., Internet, Bluetooth, NFC) based on the device and/or user.

In some examples, a user device may be a mobile device. In some embodiments, the user device may be a non-mobile device. In various examples, the devices may connect wirelessly. In various embodiments, the devices may connect via a wired connection.

Figure 14:
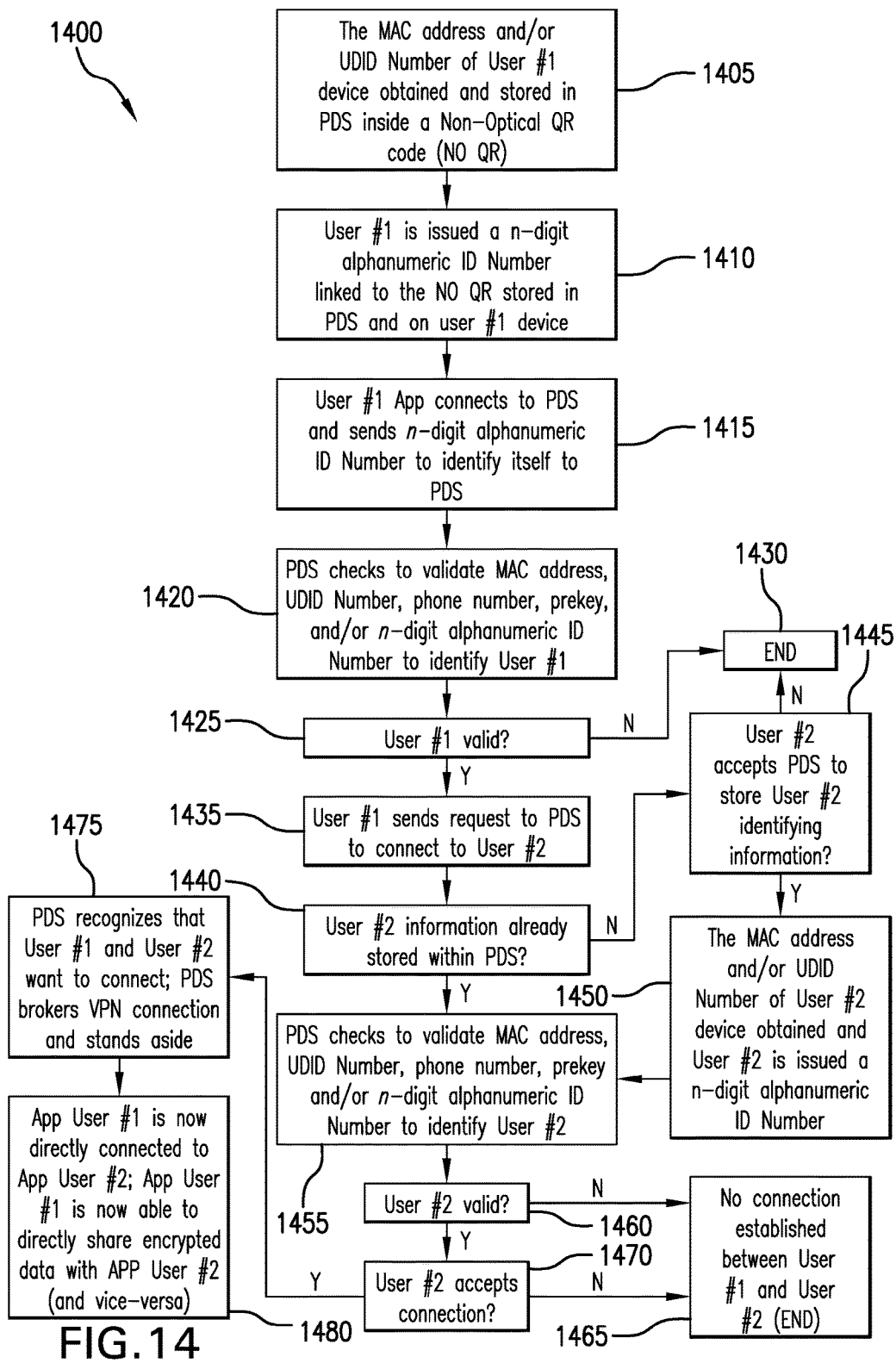
FIG. 14 depicts a flowchart of an exemplary set of steps for configuring a connection between users via a PCS.

FIG. 14 depicts a flowchart of an exemplary set of steps for configuring a connection between users via a PDS. A method 1400 begins with a step 1405 of the MAC Address and/or UDID number of user 1 device being obtained by and stored in PDS inside a NO QR. In a step 1410, user 1's device issues an n-digit alphanumeric ID number linked to the NO QR stored in the PDS, both codes being stored on user 1's device. In a step 1415, user 1's device connects to the PDS and sends its n-digit alphanumeric ID number to identify user 1's device to the PDS. In a step 1420, the PDS checks user 1 device's MAC Address, UDID number, phone number, prekey, n-digit alphanumeric ID number, and/or NO QR to validate and identify user 1's device. In a decision step 1425, user 1's device is determined to be valid or not valid. If the user 1's device is determined not to be valid, then the process comes to an end 1430.

If the user 1 device is determined to be valid, the process continues at a step 1435 and user 1 can send a request to PDS to connect to user 2. If at a step 1440 user 2's device is not already stored within the PDS, then user 2 is prompted for whether they accept the PDS to store their identifying information (e.g., MAC Address, UDID number) at a step 1445. If the user denies the request to store their identifying information, the process comes to an end 1430. If the user accepts the request to store their identifying information, then the MAC Address and/or UDID number of user 2 device is obtained and stored in the PDS, and user 2 device is issued an n-digit alphanumeric ID number that is stored on both user 2's device and the PDS at a step 1450. Next, the PDS checks user 2 device's MAC Address, UDID number, phone number, prekey, n-digit alphanumeric ID number, and/or NO QR to validate and identify user 2 device at a step 1455. The method 1400 also arrives at the step 1455 if at the step 1440 the user 2 device information is already stored within the PDS.

Next, at a step 1460, user 2 device is determined to be valid or not valid. If user 2 device is determined to not be valid, then no connection is established between user 1 and user 2 devices at a step 1465. If user 2 device is determined to be valid, then user 2 is prompted to accept or reject the connection at a step 1470. If user 2 rejects the connection, then no connection is established between user 1 and user 2 devices at the step 1465. If user 2 accepts the connection, then the PDS recognizes that user 1 and user 2 want to connect at a step 1475. The PDS then brokers a VPN connection between user 1 and user 2 devices and stands aside. At a step 1480, user 1 and user 2 devices are not directly connected though a VPN tunnel, and are able to directly share encrypted data with each other.

In some examples, the steps in the method 1400 may be performed in a different order, or may be optional or skipped. For example, if identifying information for user 1 and/or user 2 are already stored within PDS, then the steps 1405, 1410, 1440, 1445, and/or 1450 may not be required. In some examples, the roles of user 1 and user 2 may be reversed. In various embodiments, user 2 may automatically accept the connection to user 1 if, for example, user 1 is in user 2's contact list (thus skipping the step 1470).

Although various embodiments have been described with reference to the Figures, other embodiments are possible. For example, users of the ASKLINDA APP may be encouraged to scan each product before putting into their shopping carts. In this way, the user is enlisted as a check-out person, which may reduce the number of employees necessary to conduct business. The user may then simply perform a secure transaction using the ASKLINDA APP to complete his/her purchase. The business may provide grocery bags at the entrance of the store so that the user may bag his/her groceries as he puts them into the cart.

In some examples, upon a user's wireless mobile application device entering into a predetermined physical space or region, a wireless communications link may be established between the user's wireless mobile application device and a network device. In some examples, the wireless communications link may be a Wi-Fi Direct communications channel.

In some examples, product or service information may include recommendations for the user. In some examples, an algorithm may be used to rank the type of product or service information, or the types of recommendations sent to a user's wireless mobile application device. For example, the algorithm may calculate a similarity index using the Jaccard index formula. In one example, the algorithm may use one or more machine learning techniques, alone or in combination (e.g., Bayesian Classifiers, cluster analysis, decision trees, or neural networks). The algorithm may use collaborative filtering, content-based filtering, or a hybrid-recommender approach.

In some examples, a PCS may employ features for connections between devices, and may employ encrypted sharing text, data, and/or files. In some embodiments, the PCS APP 1 may initiate through wireless or telecom connections to the Internet. In various examples, the PCS APP 1 may request or connect to the IP address of the PDS. The PDS may then accept the PCS APP 1 connection. In some examples, the PCS APP 1 may request connection to PCS APP 2 using a unique identity code. In various embodiments, the PDS may search a database to determine if the PCS APP 2 is connected. If the PCS APP 2 is determined not to be connected, then the PDS may send a push notification notice to the PCS APP 2 to open the PCS APP 2 for a desired connection. In various examples, the PCS APP 2 opens and the user selects "Internet" to connect to the Internet. In some embodiments, the PCS APP 2 requests and/or connects to the IP address of the PDS. The PDS may then accept the PCS APP 2 connection. The PDS may then step back and allow the PCS APP 2 to accept connections from the PCS APP 1. PCS APP 1 and PCS APP 2 may now be connected directly to each other via a long-distance connection, through an Internet connection by way of a private server/connection. The two apps may then be able to send and receive encrypted text, data, and/or files that never pass through the server.

In some examples, some contact information may be kept in the PDS. In various examples, the PDS may send the QR code to be read by an initiating APP to read the QR code containing the contact information being sent by user 1 device to identify the name and phone number of user 2 device to whom the connection is being established. In some examples, a user's contact list may be required to be in the server, the contact list being contained in a non-optical QR code that cannot be read by the server, but is sent to the initiating APP to validate a requested connection. In various embodiments, the PCS may be required to send the QR code to User1 to read the Non-Optical QR Code containing the contact information being sent from User1 to the PCS for matching and validation purposes to allow User2 to respond to the connection request.

In various embodiments, when User1 selects a contact by viewing their phone's contact list or the PCS APP speed dial list, the PCS APP may assign a Non-Optical QR Code and send it to the PDS. The PDS may already have that contact name and phone number on file in form of a "QR Code" stored in the server. The PDS may then match the QR Code sent by User 1 with the stored QR Code in the server to verify authenticity for connection. The server-stored QR Code may contain the contact information that the PDS uses to either send a Push Notification to turn on the app, or "steps back" and allows the connection if the app is already connected to the server. In various embodiments, after the connection between User 1 and User 2 is consummated, the PDS may delete the QR Code sent from User 1.

In some examples, the devices at either end of an Internet Protocol Security (IPSec) VPN tunnel may be referred to as IPSec peers. When two IPSec peers want to make a VPN connection between them, they may exchange a series of messages about encryption and authentication, and attempt to agree on many different parameters. This process may be known as VPN negotiations. One device in the negotiation sequence may be the initiator and the other device may be the responder. VPN negotiations may happen in two distinct phases: Phase 1 and Phase 2. In Phase 1 a secure encrypted channel may be set up through which the two peers can negotiate Phase 2. When Phase 1 finishes successfully, the peers may move on to Phase 2 negotiations. If Phase 1 fails, the devices may not begin Phase 2. In Phase 2, the two peers may agree on a set of parameters that define what traffic can go through the VPN, and how to encrypt and authenticate the traffic. This agreement may be called a Security Association. In some examples, the Phase 1 and Phase 2 configurations may be required to match for the devices on either end of the tunnel.

In some embodiments, the IP address of user devices may change as users go from WiFi to 3G/4G or across providers. A virtual static IP address may be assigned to the device that stays constantly connected, even while the physical IP address changes across providers. In some examples, user devices may have dynamic IP addresses. In various embodiments, the PDS may have a record of a user device's IP address. In some examples, the PCS APP will have a record of user devices IP addresses.

In some examples, a user's speed dial list may be stored on the PDS. In some examples, the MAC Addresses and/or UDID numbers may be stored on the server in an encrypted format (e.g., 256-bit encryption). In some examples, each name and/or phone number in a user's contact list is QR encoded. In some embodiments, the PCS APP may have a QR code reader to read the NO QR. In some examples, the non-optical QR code may only be stored on a user's PCS APP (not on the PDS).

In various embodiments, the PDS may not see messages sent between users on a private connection. In various examples, the PDS may not store which users send messages and when they were sent. In some examples, each user contact may have a separate associated NO QR. In some embodiments, a handshake may take place between a user device and the PDS. In some examples, a handshake may take place between user devices. In some examples, the n-digit code may be a way for the PDS to identify a device without publishing the devices MAC Address or UDID number. In some examples, the PDS may not be able to read NO QRs. In some embodiments, NO QRs may be inherently AES-64 bit encrypted. In some examples, the NO QRs may be doubly encrypted with an additional layer of AES-256 encryption. In some examples, the data sent through the VPN tunnel may be doubly encrypted as well (e.g., AES-64 bit plus AES-256 bit).

In some embodiments, when a first user selects a second user to connect to, the PDS may check that the second user is valid and/or subscribed. In some examples, the NO QR may only be readable by the user device to which it corresponds. In various embodiments, once the private connection is established between two or more user devices, the devices can send confidential information without the information passing through the PDS. In some examples, a device may only be authorized by the PDS if the device's MAC Address and/or UDID is stored in the PDS. In such cases, the PDS may immediately discard the query, so that data is only stored for authorized/valid users.

In some examples, once the PDS authorizes/validates user devices by their MAC Address/UDID number, the PCS APPs on the devices make the private connection between the devices. For example, the VPN tunnel may not be created by the server. Rather, the PCS APPs on the user devices may create the VPN between themselves (e.g., endpoint to endpoint). In some embodiments, the VPN tunnel may be created using user devices' IP addresses. In some embodiments, the VPN tunnel may use various data compression standards.

In some examples, the PCS APP may be a distributed application that connects user devices only by the PDS having a record of MAC Addresses/UDID numbers and/or associated n-digit codes. This may advantageously provide users with privacy and security when sending data using the PCS APP. In some embodiments, the PDS may not require a user's contact list to be shared with the PDS.

In some embodiments, each user contact is stored in a NO QR that is associated with a n-digit code. In various examples, a user who does not have the PCS APP opened may receive a push notification from another user who desires to connect. In various embodiments, the PCS APP may be exclusively downloaded from the PDS. In some examples, for user devices to connect using the PCS system, they must have the PCS APP installed.

In some examples, the functionality and/or features of the ASKLINDA APP and the PCS APP may be utilized in combination. For example, a user entering a store may have a user device with the PCS APP and the ASKLINDA APP installed (or combined APP), where the user device connects to a merchant processor acting as a PDS. The merchant processor may verify/authorize the MAC Address/UDID number of the user device with an n-digit code/NO QR that is stored on the merchant processor system. A verified/authorized user may then connect to a CES provider using a private VPN tunnel. Once the user device and the CES provider are connected through the secure VPN tunnel, the merchant processor may then discard the queries associated with this interaction. In this sense, the merchant processor may only facilitate the connection between the user device and the CES provider, without any of the data sent between the user device and CES provider passing through the merchant processor system.

In some embodiments, a user entering a non-network-supporting merchant's store may have a user device with the PCS APP and the ASKLINDA APP installed (or combined APP), where the user device connects to a PDS to set up a private, secure connection between the user device and a CES provider. A user device may communicate through a cellular network of a phone carrier, for example. The PDS may verify/authorize the MAC Address/UDID number of the user device and CES provider with their respective an n-digit codes/NO QRs. A verified/authorized user and CES provider may then connect to each other using a private VPN tunnel. Once the user device and the CES provider are connected through the secure VPN tunnel, the PDS may then discard the queries associated with this interaction. In this sense, the PDS may only facilitate the connection between the user device and the CES provider, without any of the data sent between the user device and CES provider passing through the PDS.

In some examples, the merchant processor may connect to the user device using the PCS system. For example, a user entering a store may have a user device with the PCS APP and the ASKLINDA APP installed (or combined APP), where the user device connects to a PDS. The PDS may verify/authorize the MAC Address/UDID number of the user device and the merchant processor with an n-digit code/NO QR that is stored on the PDS. A verified/authorized user and merchant processor may then connect to each other using a private VPN tunnel. Once the PDS has facilitated the VPN connection between the user device and the merchant processor, the user device and merchant processor can send data between each other without any of the data passing through the PDS.

In various embodiments, the PCS system may be employed for secure encrypted data sharing for Internet of Things (IoT) devices. IoT devices may include objects embedded with electronics, software, sensors, actuators, and network connectivity which enable these objects to collect and exchange data. IoT devices may be in-use with any wireless device directly sending files through an interface to another device.

For example, a first IoT device may connect to the PDS. The PDS may then verify/authorize the IoT device using the MAC Address/UDID number of the IoT device with an n-digit code/NO QR that may be stored on the PDS. The first IoT device, once verified/authorized, may then request to connect to another verified/authorized IoT device over a secure channel. The PDS may facilitate creation of a VPN connection between the IoT devices, such that the devices can send data between each other without any of the data passing through the PDS.

In some examples, a user device may send/receive data to/from an IoT device over a secure VPN connection brokered by a PDS. In some embodiments, a user device may connect to the PDS. The PDS may then verify/authorize the user device using the MAC Address/UDID number of the user device with an n-digit code/NO QR that is stored on the PDS. The user device, once verified/authorized, may then request to connect to a verified/authorized IoT device over a secure channel. The PDS may facilitate creation of a VPN connection between the user device and the IoT devices, such that the devices can send data between each other without any of the data passing through the PDS.

In some embodiments, the AskLINDA APP may show the consumer where in the store the products are located, how to find products compared to where the consumer is located, whether there is backup inventory, and whether the products can be shipped. This may be based on data contained in various databases the retailer maintains. These databases may contain, among other things, planogram information, retail floor planner information, item management information, inventory information, pricing information, promotional information, and/or retail operation information.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A computer program product (CPP) tangibly embodied in a computer readable medium and containing instructions that, when executed, cause a processor to perform operations to provide merchant product information to a user's wireless mobile application device (WMAD), the operations comprising:
   automatically establishing a wireless communications link between a short-range communications network of a merchant and the WMAD upon the WMAD entering into a predetermined region defined by the merchant's premises;
   receiving, from the WMAD via the wireless communications link, unique identifying information associated with the user;
   receiving, from the WMAD via the wireless communications link, a user data request;
   retrieving records associated with the unique identifying information from a customer database containing records of past customer history;
   identifying, for suggestion via the WMAD, product information specific to the merchant from a merchant product information database based on each product's similarity to the retrieved records of past customer history;
   sending, to the WMAD via the wireless communications link, the identified product information for presentation on the WMAD; and,
   sending, to the WMAD via the wireless communications link, a response to the user data request for presentation on the WMAD.

2. The CPP of claim 1, wherein the operations further comprise:
   sending, to the WMAD via the wireless communications link, merchant-unique branding information for presentation on the WMAD.

3. The CPP of claim 1, wherein the operations further comprise:
   periodically sending a query to the WMAD to check if the WMAD is within range of the merchant's short-range communication network.

4. The CPP of claim 1, wherein the operations further comprise:
   receiving, from the WMAD via the wireless communications link, user input of selections made based on the identified product information presented on the WMAD.

5. The CPP of claim 1, wherein the identified product information is selected from the group consisting of rewards, promotions, coupons, and recommendations.

6. The CPP of claim 5, wherein the recommendations comprise a list of products the user has previously purchased from the merchant.

7. The CPP of claim 5, wherein the recommendations are calculated based on a content-based filtering algorithm.

8. The CPP of claim 1, wherein the step of receiving a user data request comprises requesting a location of a specific product located on the merchant's premises.

9. The CPP of claim 8, wherein the step of sending a response to the user data request for presentation on the WMAD comprises responding with path information indicating a route to the location of the specific product located on the merchant's premises.

10. The CPP of claim 1, wherein the types of presentation are selected from the group consisting of audio presentation, haptic presentation, and visual presentation.

11. A computer program product (CPP) tangibly embodied in a computer readable medium and containing instructions that, when executed, cause a processor to perform operations to provide merchant product information to a user's wireless mobile application device (WMAD), the operations comprising:
   automatically establishing a wireless communications link between a short-range communications network of a merchant and the WMAD upon the WMAD entering into a predetermined region defined by the merchant's premises;
   receiving, from the WMAD via the wireless communications link, unique identifying information associated with the user;
   retrieving records associated with the unique identifying information from a customer database containing records of past customer history;
   identifying, for suggestion via the WMAD, product information specific to the merchant from a merchant product information database based on each product's similarity to the retrieved records of past customer history; and,
   sending, to the WMAD via the wireless communications link, the identified product information for presentation on the WMAD.

12. The CPP of claim 11, wherein the operations further comprise:
   sending, to the WMAD via the wireless communications link, merchant-unique branding information for presentation on the WMAD.

13. The CPP of claim 11, wherein the operations further comprise:
   periodically sending a query to the WMAD to check if the WMAD is within range of the merchant's short-range communication network.

14. The CPP of claim 11, wherein the operations further comprise:
   receiving, from the WMAD via the wireless communications link, user input of selections made based on the identified product information presented on the WMAD.

15. The CPP of claim 11, wherein the identified product information is selected from the group consisting of rewards, promotions, coupons, and recommendations.

16. The CPP of claim 11, wherein the operations further comprise:
   receiving, from the WMAD via the wireless communications link, the user's grocery list; and,
   sending, to the WMAD via the wireless communications link, optimal path information that passes every item of the user's grocery list.

17. A computer program product (CPP) tangibly embodied in a computer readable medium and containing instructions that, when executed, cause a processor to perform operations to provide merchant product information to a user's wireless mobile application device (WMAD), the operations comprising:
   automatically establishing a wireless communications link between a short-range communications network of a merchant and the WMAD upon the WMAD entering into a predetermined region defined by the merchant's premises;
   receiving, from the WMAD via the wireless communications link, encoded unique identifying information associated with the user;
   step for decoding the encoded unique identifying information;
   retrieving records associated with the decoded unique identifying information from a customer database containing records of past customer history;
   identifying, for suggestion via the WMAD, product information specific to the merchant from a merchant product information database based on each product's similarity to the retrieved records of past customer history; and,
   sending, to the WMAD via the wireless communications link, the identified product information for presentation on the WMAD.

18. The CPP of claim 17, wherein the operations further comprise:
   sending, to the WMAD via the wireless communications link, merchant-unique branding information for presentation on the WMAD.

19. The CPP of claim 17, wherein the operations further comprise:
   receiving, from the WMAD via the wireless communications link, user input of selections made based on the identified product information presented on the WMAD.

20. The CPP of claim 17, wherein the operations further comprise:
   receiving, from the WMAD via the wireless communications link, the user's grocery list; and,
   sending, to the WMAD via the wireless communications link, optimal path information that passes every item of the user's grocery list.

* * * * *